US011620640B2

(12) United States Patent
Artman et al.

(10) Patent No.: US 11,620,640 B2
(45) Date of Patent: *Apr. 4, 2023

(54) CONSUMER DEVICE BASED POINT-OF-SALE

(71) Applicant: Groupon, Inc., Chicago, IL (US)

(72) Inventors: Tuomas Artman, San Francisco, CA (US); Jyri Engestrom, San Francisco, CA (US); Ulf Schwekendiek, San Francisco, CA (US)

(73) Assignee: GROUPON, INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/862,041

(22) Filed: Apr. 29, 2020

(65) Prior Publication Data
US 2020/0320512 A1   Oct. 8, 2020

Related U.S. Application Data

(63) Continuation of application No. 14/454,695, filed on Aug. 7, 2014, now abandoned, which is a (Continued)

(51) Int. Cl.
*G06Q 20/36* (2012.01)
*G06Q 30/06* (2012.01)
(Continued)

(52) U.S. Cl.
CPC ............ *G06Q 20/36* (2013.01); *G06Q 20/14* (2013.01); *G06Q 20/227* (2013.01);
(Continued)

(58) Field of Classification Search
CPC .... G06Q 20/36; G06Q 30/06; G06Q 20/3278; G06Q 20/14; G06Q 20/227; G06Q 50/12; G06Q 30/00
See application file for complete search history.

(56) References Cited

U.S. PATENT DOCUMENTS

| 2,153,480 A | 4/1939 | Pierce |
| 6,208,468 B1 | 3/2001 | Togino et al. |

(Continued)

FOREIGN PATENT DOCUMENTS

| EP | 1017030 A2 | 7/2000 |
| EP | 2909799 A1 | 8/2015 |

(Continued)

OTHER PUBLICATIONS

Keats et al. Bayesian inference for source determination with applications to a complex urban environment. Atmospheric Environment 41 (2007) 465-479. (Year: 2007).*

(Continued)

*Primary Examiner* — Virpi H Kanervo
(74) *Attorney, Agent, or Firm* — Alston & Bird LLP

(57) ABSTRACT

Systems and related methods facilitating interactions between a merchant device, a central system and a consumer device are discussed herein. Wallet identifying data may be used to secure messages between the consumer device and the merchant device over a wireless link. For example, the merchant device may include circuitry configured to wirelessly receive the wallet identifying data from a consumer device and to transmit the wallet identifying data to the central system. In response, consumer identifying data associated with the wallet identifying data may be received by the merchant device from the central system. In some embodiments, the consumer identifying data may be associated with a unit of location, such as a dine-in location at a restaurant, to facilitate consumer service.

20 Claims, 18 Drawing Sheets

Related U.S. Application Data continuation of application No. 13/794,529, filed on Mar. 11, 2013, now Pat. No. 9,576,286.

(51) Int. Cl.
  *G06Q 20/32* (2012.01)
  *G06Q 20/14* (2012.01)
  *G06Q 20/22* (2012.01)
  *G06Q 50/12* (2012.01)

(52) U.S. Cl.
  CPC ..... *G06Q 20/3224* (2013.01); *G06Q 20/3278* (2013.01); *G06Q 30/06* (2013.01); *G06Q 50/12* (2013.01)

(56) References Cited

U.S. PATENT DOCUMENTS

| | | |
|---|---|---|
| 6,327,578 B1 | 12/2001 | Linehan |
| 6,487,180 B1 | 11/2002 | Borgstahl et al. |
| 6,764,013 B2 | 7/2004 | Ben-Aissa |
| 6,812,851 B1 | 11/2004 | Dukach et al. |
| 6,873,974 B1 | 3/2005 | Schutzer |
| 7,177,847 B2 | 2/2007 | Atkinson et al. |
| 7,229,013 B2 | 6/2007 | Ben-Aissa |
| 7,411,491 B2 | 8/2008 | Klabunde et al. |
| 7,475,813 B2 * | 1/2009 | Swanson, Sr. ......... G06Q 30/00 235/383 |
| 7,527,194 B2 | 5/2009 | Truitt et al. |
| 7,584,118 B1 | 9/2009 | Bellare et al. |
| 7,609,821 B2 | 10/2009 | Delaney et al. |
| 7,653,883 B2 | 1/2010 | Hotelling et al. |
| 7,774,231 B2 | 8/2010 | Pond et al. |
| 7,891,560 B2 | 2/2011 | Hammad |
| 7,934,986 B2 | 5/2011 | Kane et al. |
| 8,045,967 B2 | 10/2011 | Lovegreen et al. |
| 8,131,619 B1 | 3/2012 | Veselka |
| 8,224,700 B2 | 7/2012 | Silver |
| 8,229,853 B2 | 7/2012 | Dispensa et al. |
| 8,284,061 B1 | 10/2012 | Dione |
| 8,370,264 B1 | 2/2013 | Wei et al. |
| 8,844,002 B2 | 9/2014 | Monahan et al. |
| 9,117,231 B2 | 8/2015 | Rodgers et al. |
| 9,576,286 B1 | 2/2017 | Artman et al. |
| 9,674,050 B2 * | 6/2017 | Martin .................... H04L 41/50 |
| 9,852,409 B2 | 12/2017 | Artman et al. |
| 10,148,659 B2 | 12/2018 | Nandakumar |
| 2001/0029496 A1 | 10/2001 | Otto et al. |
| 2002/0017561 A1 | 2/2002 | Tomoike |
| 2002/0029342 A1 | 3/2002 | Keech |
| 2002/0072921 A1 | 6/2002 | Boland et al. |
| 2002/0073044 A1 | 6/2002 | Singhal |
| 2002/0077993 A1 | 6/2002 | Immonen et al. |
| 2002/0083342 A1 | 6/2002 | Webb et al. |
| 2002/0107610 A1 | 8/2002 | Kaehler et al. |
| 2002/0107791 A1 | 8/2002 | Nobrega et al. |
| 2002/0142753 A1 | 10/2002 | Pecen et al. |
| 2002/0151313 A1 | 10/2002 | Stead |
| 2002/0174023 A1 | 11/2002 | Grey et al. |
| 2003/0037113 A1 | 2/2003 | Petrovykh |
| 2003/0088682 A1 | 5/2003 | Hlasny |
| 2003/0172036 A1 | 9/2003 | Feigenbaum |
| 2003/0208409 A1 | 11/2003 | Mault |
| 2004/0030601 A1 | 2/2004 | Pond et al. |
| 2004/0116074 A1 | 6/2004 | Fujii et al. |
| 2004/0143473 A1 | 7/2004 | Tivey et al. |
| 2005/0028082 A1 | 2/2005 | Topalov et al. |
| 2005/0043996 A1 | 2/2005 | Silver |
| 2005/0182680 A1 | 8/2005 | Jones et al. |
| 2005/0187873 A1 | 8/2005 | Labrou et al. |
| 2005/0256841 A1 | 11/2005 | Rawat et al. |
| 2005/0273345 A1 | 12/2005 | Castillejo Romero |
| 2006/0069763 A1 | 3/2006 | Kido |
| 2006/0085267 A1 | 4/2006 | Lovegreen et al. |
| 2006/0122855 A1 * | 6/2006 | Prorock ............... G06Q 20/208 705/23 |
| 2006/0156060 A1 | 7/2006 | Forrer et al. |
| 2006/0165060 A1 | 7/2006 | Dua |
| 2006/0178943 A1 | 8/2006 | Rollinson et al. |
| 2006/0218043 A1 | 9/2006 | Rosenzweig et al. |
| 2007/0012763 A1 | 1/2007 | Van et al. |
| 2007/0061209 A1 | 3/2007 | Jackson |
| 2007/0150371 A1 | 6/2007 | Gangji |
| 2007/0162337 A1 | 7/2007 | Hawkins et al. |
| 2007/0219923 A1 | 9/2007 | Shea et al. |
| 2007/0250355 A1 | 10/2007 | Leet et al. |
| 2007/0280269 A1 | 12/2007 | Rosenberg |
| 2007/0282739 A1 | 12/2007 | Thomsen |
| 2007/0291915 A1 | 12/2007 | Tseitlin et al. |
| 2008/0010193 A1 | 1/2008 | Rackley et al. |
| 2008/0051122 A1 | 2/2008 | Fisher |
| 2008/0064374 A1 | 3/2008 | Coffing |
| 2008/0065374 A1 | 3/2008 | Mittal et al. |
| 2008/0065490 A1 | 3/2008 | Novick et al. |
| 2008/0097851 A1 | 4/2008 | Bemmel et al. |
| 2008/0143487 A1 | 6/2008 | Hulvey |
| 2008/0147546 A1 * | 6/2008 | Weichselbaumer ....................... G06Q 20/105 705/41 |
| 2008/0162318 A1 | 7/2008 | Butler et al. |
| 2008/0182616 A1 | 7/2008 | Connors et al. |
| 2008/0208744 A1 | 8/2008 | Arthur et al. |
| 2008/0222004 A1 | 9/2008 | Pollock et al. |
| 2008/0271119 A1 | 10/2008 | Manne et al. |
| 2009/0030749 A1 | 1/2009 | Drummond et al. |
| 2009/0037286 A1 | 2/2009 | Foster |
| 2009/0063312 A1 | 3/2009 | Hurst |
| 2009/0070263 A1 | 3/2009 | Davis et al. |
| 2009/0076896 A1 | 3/2009 | DeWitt et al. |
| 2009/0167553 A1 | 7/2009 | Hong et al. |
| 2009/0192935 A1 | 7/2009 | Griffin et al. |
| 2009/0204881 A1 | 8/2009 | Murthy et al. |
| 2009/0265229 A1 | 10/2009 | Sidhu |
| 2009/0271295 A1 | 10/2009 | Hodge |
| 2010/0082481 A1 | 4/2010 | Lin et al. |
| 2010/0094701 A1 | 4/2010 | Ghosh et al. |
| 2010/0145861 A1 | 6/2010 | Law et al. |
| 2010/0250549 A1 | 9/2010 | Muller et al. |
| 2010/0252624 A1 | 10/2010 | Van et al. |
| 2010/0274680 A1 | 10/2010 | Carlson et al. |
| 2010/0276484 A1 | 11/2010 | Banerjee et al. |
| 2010/0320266 A1 | 12/2010 | White |
| 2010/0325047 A1 | 12/2010 | Carlson et al. |
| 2011/0010422 A1 | 1/2011 | Bezancon et al. |
| 2011/0029362 A1 | 2/2011 | Roeding et al. |
| 2011/0029370 A1 | 2/2011 | Roeding et al. |
| 2011/0041170 A1 | 2/2011 | Wankmueller |
| 2011/0047608 A1 | 2/2011 | Levenberg |
| 2011/0055005 A1 | 3/2011 | Lang |
| 2011/0057025 A1 | 3/2011 | Denzer et al. |
| 2011/0088087 A1 | 4/2011 | Kalbratt |
| 2011/0173096 A1 | 7/2011 | Bui |
| 2011/0191196 A1 | 8/2011 | Orr et al. |
| 2011/0218911 A1 | 9/2011 | Spodak |
| 2011/0238499 A1 | 9/2011 | Blackhurst et al. |
| 2011/0313867 A9 | 12/2011 | Silver |
| 2011/0320293 A1 | 12/2011 | Khan |
| 2012/0005023 A1 | 1/2012 | Graff |
| 2012/0016745 A1 | 1/2012 | Hendrickson |
| 2012/0029990 A1 | 2/2012 | Fisher |
| 2012/0030066 A1 | 2/2012 | Stringfellow et al. |
| 2012/0036042 A1 | 2/2012 | Graylin et al. |
| 2012/0072311 A1 | 3/2012 | Khan |
| 2012/0088487 A1 | 4/2012 | Khan |
| 2012/0095852 A1 | 4/2012 | Bauer et al. |
| 2012/0136754 A1 | 5/2012 | Underwood |
| 2012/0150669 A1 | 6/2012 | Langley et al. |
| 2012/0158528 A1 | 6/2012 | Hsu et al. |
| 2012/0158541 A1 | 6/2012 | Ganti et al. |
| 2012/0172062 A1 | 7/2012 | Altman et al. |
| 2012/0173350 A1 | 7/2012 | Robson |
| 2012/0173431 A1 | 7/2012 | Ritchie et al. |
| 2012/0179528 A1 | 7/2012 | Ortiz et al. |
| 2012/0209729 A1 | 8/2012 | Lovegreen |
| 2012/0209730 A1 | 8/2012 | Garrett |

(56) References Cited

U.S. PATENT DOCUMENTS

| | | |
|---|---|---|
| 2012/0233005 A1 | 9/2012 | White |
| 2012/0239417 A1 | 9/2012 | Pourfallah et al. |
| 2012/0239560 A1 | 9/2012 | Pourfallah et al. |
| 2012/0246079 A1 | 9/2012 | Wilson et al. |
| 2012/0253908 A1 | 10/2012 | Ouimet et al. |
| 2012/0253913 A1 | 10/2012 | Postrel |
| 2012/0254020 A1 | 10/2012 | Debow |
| 2012/0271697 A1 | 10/2012 | Gilman et al. |
| 2012/0271759 A1 | 10/2012 | Lee |
| 2012/0290376 A1 | 11/2012 | Dryer et al. |
| 2012/0290449 A1 | 11/2012 | Mullen et al. |
| 2012/0310743 A1 | 12/2012 | Johri |
| 2012/0317628 A1 | 12/2012 | Yeager |
| 2012/0323664 A1 | 12/2012 | Klems |
| 2012/0330769 A1 | 12/2012 | Arceo |
| 2013/0024364 A1 | 1/2013 | Shrivastava et al. |
| 2013/0030915 A1* | 1/2013 | Statler .................. G06Q 30/06 705/7.29 |
| 2013/0036048 A1 | 2/2013 | Campos et al. |
| 2013/0036051 A1 | 2/2013 | Giordano et al. |
| 2013/0046634 A1 | 2/2013 | Grigg et al. |
| 2013/0047242 A1 | 2/2013 | Radhakrishnan |
| 2013/0073365 A1 | 3/2013 | McCarthy |
| 2013/0097031 A1 | 4/2013 | Royyuru et al. |
| 2013/0138518 A1 | 5/2013 | White et al. |
| 2013/0144731 A1 | 6/2013 | Baldwin et al. |
| 2013/0151357 A1 | 6/2013 | Havas et al. |
| 2013/0159080 A1 | 6/2013 | Wu et al. |
| 2013/0159119 A1 | 6/2013 | Henderson et al. |
| 2013/0159181 A1 | 6/2013 | Hueck |
| 2013/0166917 A1 | 6/2013 | Granbery |
| 2013/0173475 A1 | 7/2013 | Lund |
| 2013/0191174 A1 | 7/2013 | Zhou et al. |
| 2013/0191227 A1 | 7/2013 | Pasa et al. |
| 2013/0282438 A1 | 10/2013 | Hunter et al. |
| 2013/0282533 A1 | 10/2013 | Foran-Owens |
| 2013/0304642 A1 | 11/2013 | Campos |
| 2013/0317928 A1 | 11/2013 | Laracey |
| 2013/0339233 A1 | 12/2013 | Lee et al. |
| 2013/0346302 A1 | 12/2013 | Purves et al. |
| 2014/0006182 A1 | 1/2014 | Wilson |
| 2014/0006205 A1 | 1/2014 | Berry et al. |
| 2014/0032297 A1 | 1/2014 | Germann et al. |
| 2014/0037193 A1 | 2/2014 | El et al. |
| 2014/0058862 A1 | 2/2014 | Celkonas |
| 2014/0058938 A1 | 2/2014 | McClung, III |
| 2014/0067677 A1 | 3/2014 | Ali et al. |
| 2014/0074655 A1 | 3/2014 | Lim et al. |
| 2014/0099981 A1 | 4/2014 | Horbal |
| 2014/0100973 A1 | 4/2014 | Brown et al. |
| 2014/0108108 A1 | 4/2014 | Artman et al. |
| 2014/0108247 A1 | 4/2014 | Artman et al. |
| 2014/0114776 A1 | 4/2014 | Solanki et al. |
| 2014/0143018 A1 | 5/2014 | Nies et al. |
| 2014/0229375 A1 | 8/2014 | Zaytzsev et al. |
| 2014/0244354 A1 | 8/2014 | Seifert |
| 2014/0310117 A1 | 10/2014 | Moshal |
| 2014/0344153 A1 | 11/2014 | Raj et al. |
| 2015/0046276 A1 | 2/2015 | Artman et al. |
| 2015/0095133 A1 | 4/2015 | Parker et al. |
| 2015/0095134 A1 | 4/2015 | Parker et al. |
| 2015/0269557 A1 | 9/2015 | Artman et al. |
| 2019/0295066 A1 | 9/2019 | Zaytzsev et al. |

FOREIGN PATENT DOCUMENTS

| | | | |
|---|---|---|---|
| EP | 2954474 A2 | 12/2015 | |
| EP | 2973322 A1 | 1/2016 | |
| WO | 2011/112752 A1 | 9/2011 | |
| WO | 2012/106757 A1 | 8/2012 | |
| WO | 2012/135115 A2 | 10/2012 | |
| WO | 2013/066910 A1 | 5/2013 | |
| WO | WO-2013091145 A1 * | 6/2013 | ............... G01S 5/02 |
| WO | 2014/062229 A1 | 4/2014 | |
| WO | 2014/062230 A1 | 4/2014 | |
| WO | 2014/124395 A2 | 8/2014 | |
| WO | 2014/124935 A1 | 8/2014 | |
| WO | 2014/164228 A1 | 10/2014 | |
| WO | 2015/048476 A1 | 4/2015 | |

OTHER PUBLICATIONS

R. Buyya, D. Abramson and S. Venugopal, "The Grid Economy," in Proceedings of the IEEE, vol. 93, No. 3, pp. 698-714, Mar. 2005. (Year: 2005).*

EP Supplementary European Search Report for application 13846999.4 dated Apr. 4, 2016.

PCT International Preliminary Report on Patentability for application PCT/US2013/033145 dated Apr. 21, 2015.

PCT International Preliminary Report on Patentability for application PCT/US2013/033169 dated Apr. 21, 2015.

PCT International Preliminary Report on Patentability for application PCT/US2013/062389 dated Mar. 31, 2015.

PCT International Preliminary Report on Patentability for application PCT/US2014/015630 dated Aug. 11, 2015.

PCT International Preliminary Report on Patentability for application PCT/US2014/021387 dated Sep. 15, 2015.

PCT International Preliminary Report on Patentability for application PCT/US2014/057762 dated Mar. 29, 2016.

PCT International Search Report and Written Opinion of the International Searching Authority for application PCT/US2013/033145 dated Jun. 21, 2013.

PCT International Search Report and Written Opinion of the International Searching Authority for application PCT/US2014/015630 dated Dec. 8, 2014.

PCT International Search Report and Written Opinion of the International Searching Authority for application PCT/US2014/021387 dated Jul. 7, 2014.

PCT International Search Report and Written Opinion of the International Searching Authority for application PCT/US2014/057762 dated Dec. 29, 2014.

PCT International Search Report and Written Opinion of the International Searching Authority for applicationPCT/US2013/062389 dated May 27, 2014.

PCT International Search Report for application PCT/US2013/033169 dated Jun. 10, 2013.

PCT Written Opinion of the International Searching Authority for application PCT/US2013/033169 dated Jun. 10, 2013.

U.S. Appl. No. 13/801,520, Final Office Action dated Apr. 15, 2014.

U.S. Appl. No. 13/801,520, Non-Final Office Action dated Jul. 8, 2013.

U.S. Appl. No. 13/801,610, Final Office Action dated Feb. 5, 2014.

U.S. Appl. No. 13/801,610, Non-Final Office Action dated Jul. 12, 2013.

U.S. Patent Application filed Feb. 11, 2013, U.S. Appl. No. 13/764,753.

U.S. Patent Application filed Sep. 27, 2012, U.S. Appl. No. 61/706,664.

U.S. Patent Application filed Oct. 13, 2017, U.S. Appl. No. 15/784,015.

U.S. Patent Application filed Oct. 17, 2012, U.S. Appl. No. 61/715,229.

U.S. Patent Application filed Oct. 17, 2012, U.S. Appl. No. 61/715,230.

U.S. Patent Application filed Oct. 22, 2012, U.S. Appl. No. 13/657,728.

U.S. Patent Application filed on Mar. 11, 2013, U.S. Appl. No. 13/794,529.

U.S. Patent Application filed on Mar. 12, 2013, U.S. Appl. No. 13/797,264.

U.S. Patent Application filed on Jun. 2, 2016, U.S. Appl. No. 15/172,032.

U.S. Patent Application filed on Aug. 7, 2014, U.S. Appl. No. 14/454,695.

NFC, Security Risks of Near Field Communication, 2017, 1-2, retrieved on Sep. 28, 2021.

Roberts, Paul F., Bluetooth—Sniffing Highway Traffic Monitors Vulnerable to MITM Attack, Dec. 3, 2012, the security ledger, 1-4, https://securityledger.com/2012/12/bluetooth-sniffing-highway-traffic-monitors-vulnerable-to-mitm-attack/, retrieved on Sep. 28, 2021.

(56) References Cited

OTHER PUBLICATIONS

Waveform, What causes weak cell phone signal and dropped calls?, 1-3, https://www.waveform.com/pages/causes-of-weak-signal, retrieved on Sep. 28, 2021.
U.S. Appl. No. 16/196,918, filed Nov. 20, 2018 entitled "Consumer Device Payment Token Management".

* cited by examiner

CONSUMER DEVICE BASED POINT-OF-SALE

CROSS REFERENCE TO RELATED APPLICATIONS

This application is a continuation of U.S. patent application Ser. No. 14/454,695, entitled "Consumer Device Based Point-Of-Sale," filed Aug. 7, 2014, which is a continuation of U.S. patent application Ser. No. 13/794,529, entitled "Consumer Device Based Point-Of-Sale," filed Mar. 11, 2013, both of which are incorporated by reference in their entirety herein.

This application incorporates by reference each of the following in their entirety: U.S. Provisional Patent Application No. 61/715,229, entitled "Peer-to-Peer Payment Processing," filed Oct. 17, 2012, U.S. Provisional Patent Application No. 61/715,230, entitled "Consumer Presence Based Deal Offers," filed Oct. 17, 2012, U.S. Provisional Patent Application No. 61/706,664, entitled "Online Ordering for In-Shop Service," filed Sep. 27, 2012, and U.S. patent application Ser. No. 13/764,753, entitled "Consumer Device Payment Token Management," filed Feb. 11, 2013.

FIELD

Embodiments of the invention relate, generally, to facilitating interactions between consumer devices and merchant point-of-sale devices.

BACKGROUND

Financial transactions between merchants and consumers typically require the consumers to present a form of payment to the merchant. As a result, consumers may be required to keep wallets that include payment instruments such as cash, credit cards, debit cards, deal vouchers, coupons, reward tracking cards, checks or the like that may be accepted by merchants and/or their devices used at the point-of-sale (e.g., point-of-sale devices, such as cash registers, credit card readers, etc.). These payment instruments, in addition to being inconvenient to carry and use, also do not provide consumer information to merchants that can be leveraged to improve service. In this regard, areas for improving current systems have been identified. Through applied effort, ingenuity, and innovation, solutions to improve such systems have been realized and are described in connection with embodiments of the present invention.

BRIEF SUMMARY

Systems, methods, and computer readable program code are provided to, in general, facilitate consumer location-based service at a merchant shop. For example, some embodiments may provide for a merchant device. The merchant device may include a display configured to present interactive displays, communications circuitry configured to facilitate communications with a consumer device and a central system, and processing circuitry. The processing circuitry may be configured to: wirelessly receive wallet identifying data from the consumer device; transmit the wallet identifying data to the central system; receive, from the central system, consumer identifying data associated with the wallet identifying data; and associate the consumer identifying data with a unit of location at a merchant shop.

In some embodiments, the processing circuitry of the merchant device may be configured to: determine location data based on a wireless communication received from the consumer device; and determine the unit of location based on the location data. The wireless communication may be based on one or more signals using near field communication (NFC), Quick Response (QR) code, radio frequency identification (RFID), triangulation, or received signal strength indication (RSSI).

In some embodiments, the unit of location may be a dine-in location at a restaurant. The dine-in location may be associated with a table identifier that identifies, for example, a table at the restaurant. The processing circuitry of the merchant device may be configured to determine, based on the location data, the table identifier from a plurality of table identifiers.

In some embodiments, the processing circuitry of the merchant device may be configured to provide a graphical representation a floor plan with at least some of the consumer identifying data associated with the dine-in location within the floor plan. The graphical representation of the floor plan may be part of a user interface that further includes a graphical layout of a plurality of tables within the restaurant.

In some embodiments, the merchant device may be configured to facilitate payments. For example, the processing circuitry may be configured to: associate the consumer identifying data with a restaurant tab identifier; associate menu item data indicating one or more menu items with the restaurant tab identifier; determine a payment amount based on the menu item data; wirelessly send the payment amount to the consumer device; wirelessly receive consumer approval data indicating approval of a payment for at least the payment amount from the consumer device, the consumer approval data secured with a private key associated with the wallet identifying data; and send secured payment approval data based on the consumer approval data to the central system.

In some embodiments, the processing circuitry of the merchant device may be configured to: receive, from the central system, consumer information associated with the consumer identifying data; and provide the consumer information to the display when the consumer device is in proximity to the dine-in location. The consumer information may include the dine-in location preference data and the merchant device may be configured to determine the dine-in location at the restaurant based on the dine-in location preference data. Additionally and/or alternatively, the consumer information may include dine-in preference data configured to facilitate customized dining service, menu item purchase history data, one or more promotional deals redeemable at the restaurant and/or profile information of a consumer associated with the wallet identifying data.

In some embodiments, the processing circuitry of the merchant device may be further configured to: receive consumer information entered via an interactive display presented on the display; and send the consumer information to the central system. The consumer information may include one or more ordered menu items and/or dine-in location preference data wirelessly received from the consumer device and configured to facilitate a determination of the dine-in location at the restaurant.

Some embodiments may provide for a consumer device. The consumer device may include a display configured to present interactive displays, communications circuitry configured to facilitate communications with a merchant device and a central system, and processing circuitry. The processing circuitry may be configured to: receive wallet identifying data from the central system, the wallet identifying data associated with consumer identifying data that identifies a consumer; wirelessly send the wallet identifying data to a merchant device; and wirelessly transmit one or more communications configured to indicate a unit of location at a merchant shop.

Some embodiments may provide for a central system. The central system may include a networked device that includes communication circuitry configured to facilitate communications with a consumer device and a merchant device and processing circuitry. The processing circuitry may be configured to: send wallet identifying data to the consumer device, the wallet identifying data associated with consumer identifying data that identifies a consumer; receive the wallet identifying data sent to the consumer device from the merchant device; and send first consumer information associated with the consumer identifying data to the merchant device, the first consumer information configured to facilitate consumer service at a merchant shop.

In some embodiments, the central system may be further configured to: receive second consumer information from the merchant device, the second consumer information determined by the merchant device after sending the wallet identifying data to the processing circuitry of the networked device; and associate the second consumer information with the consumer identifying data.

Some embodiments may include one or more methods discussed herein. Other embodiments may include one or more machines, such as an apparatus and/or system, configured to implement the methods and/or other functionality discussed herein. For example, the machine may include one or more processors and/or other machine components configured to implement the functionality discussed herein based on instructions and/or other data stored in memory and/or other non-transitory computer readable media.

These characteristics as well as additional features, functions, and details are described below. Similarly, corresponding and additional embodiments are also described below.

BRIEF DESCRIPTION OF THE DRAWINGS

Figure 1A:
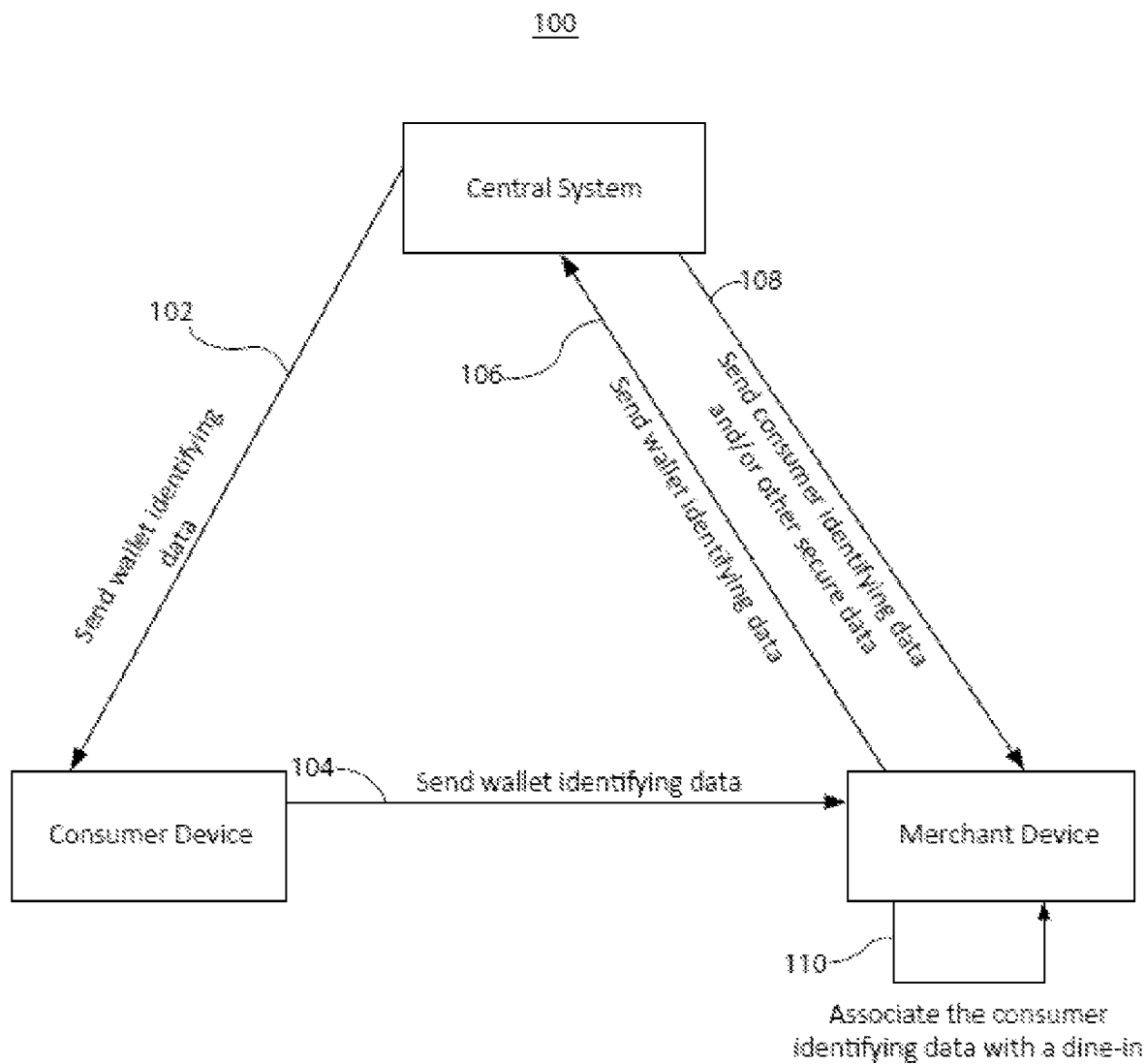
Figure 1B:
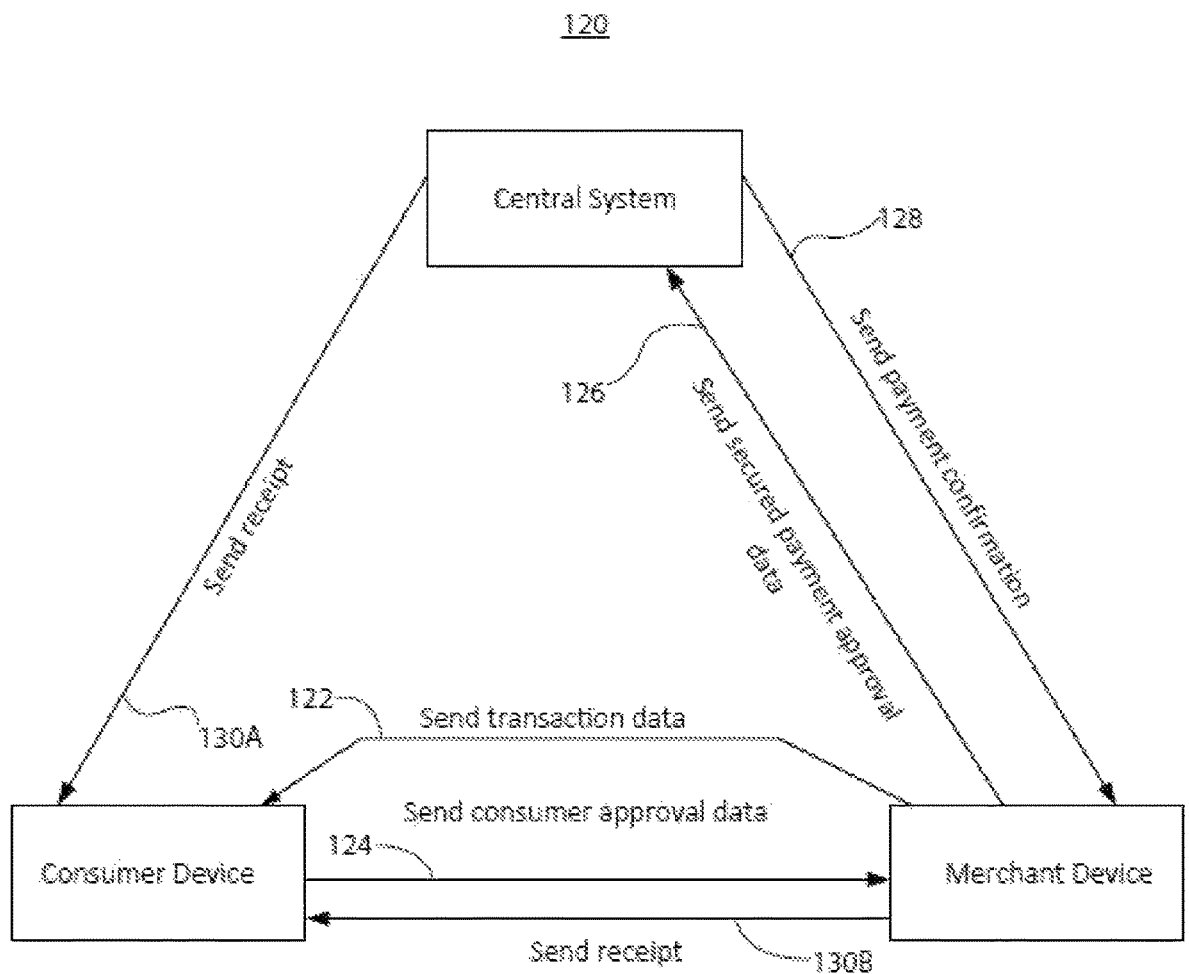
Figure 2A:
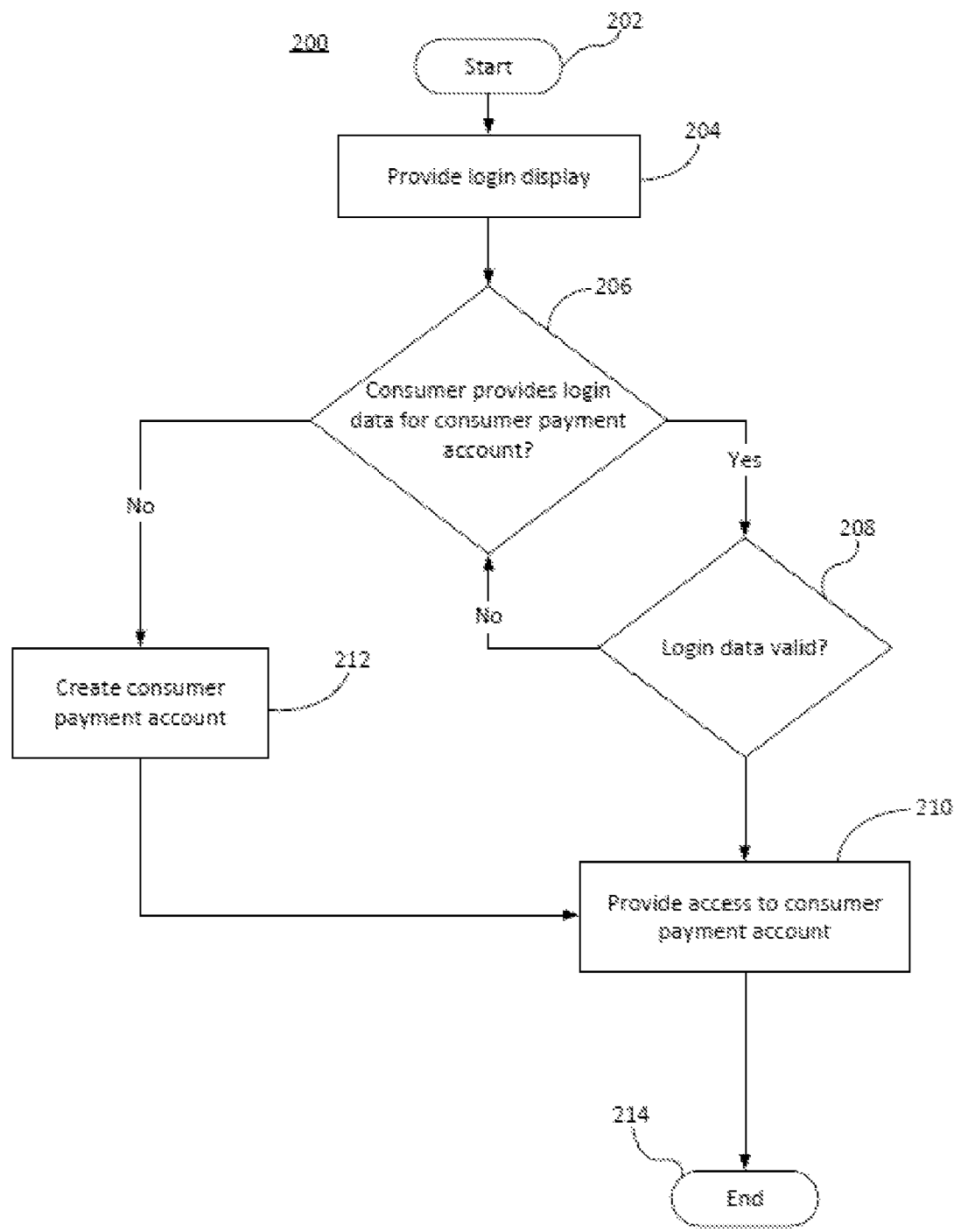
Figure 2B:
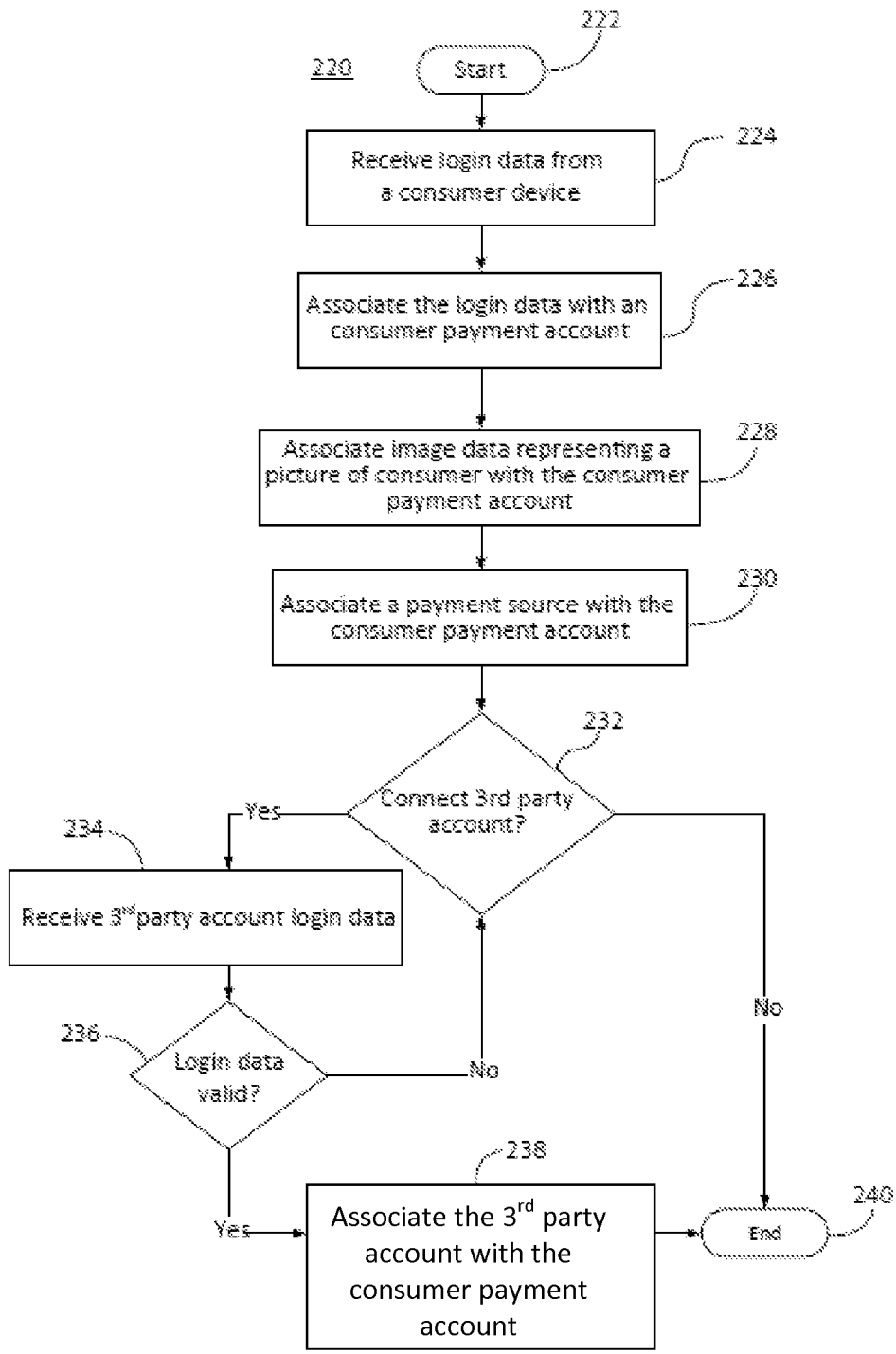
Figure 13A:
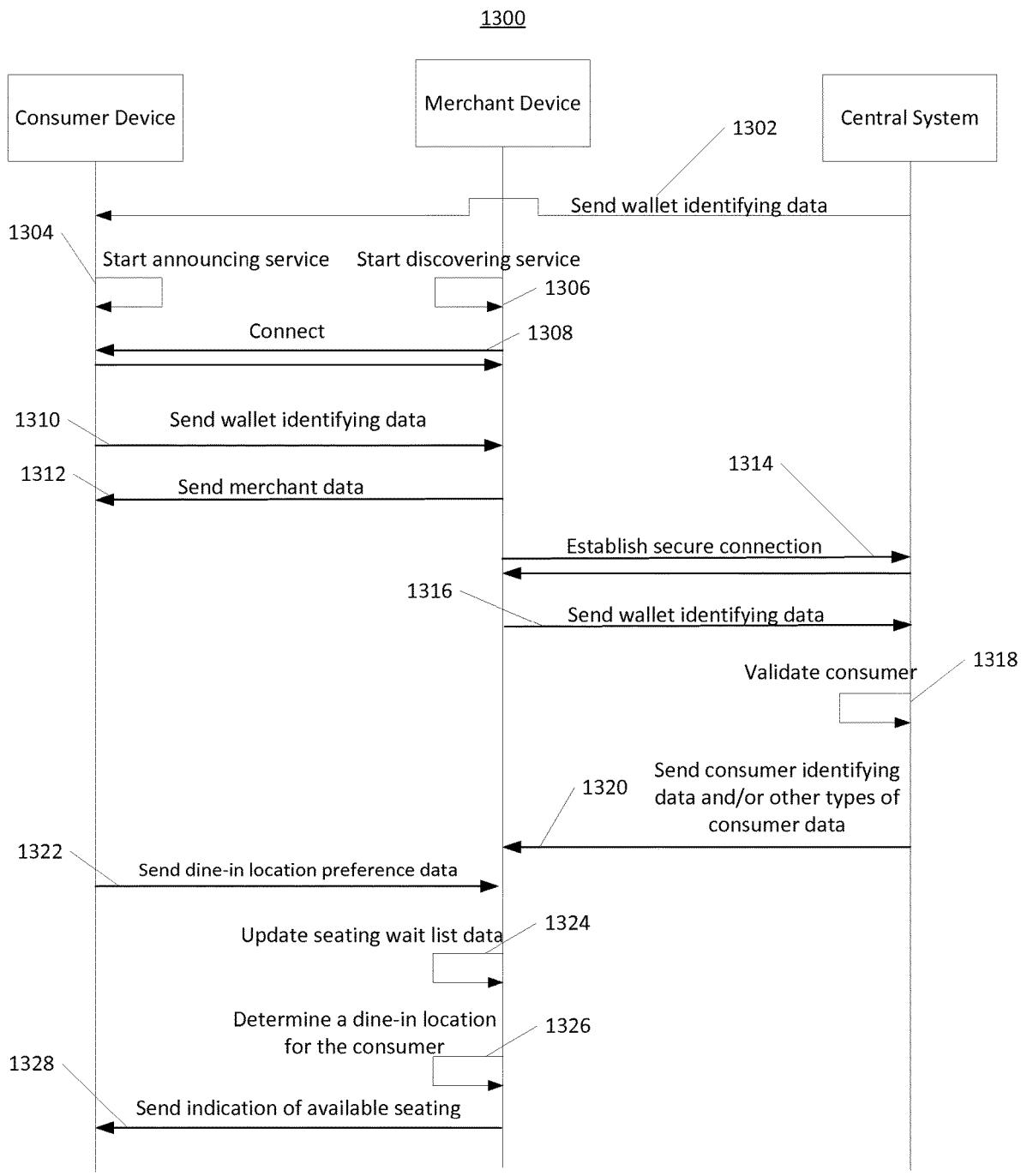
Figure 13B:
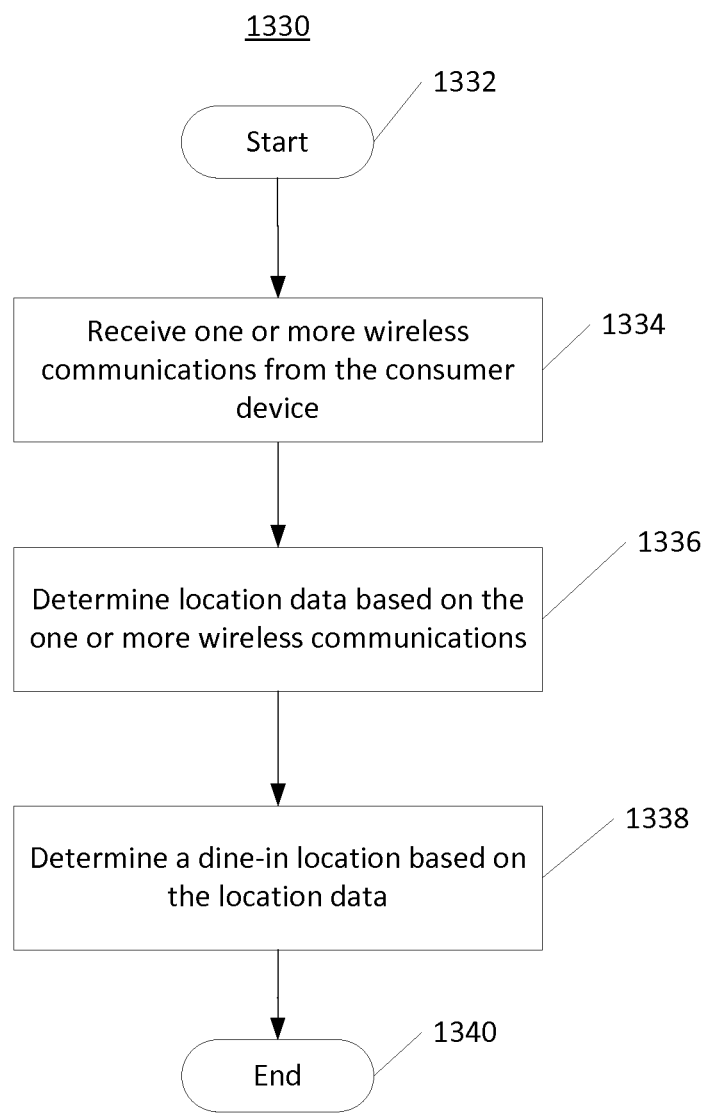
Figure 14:
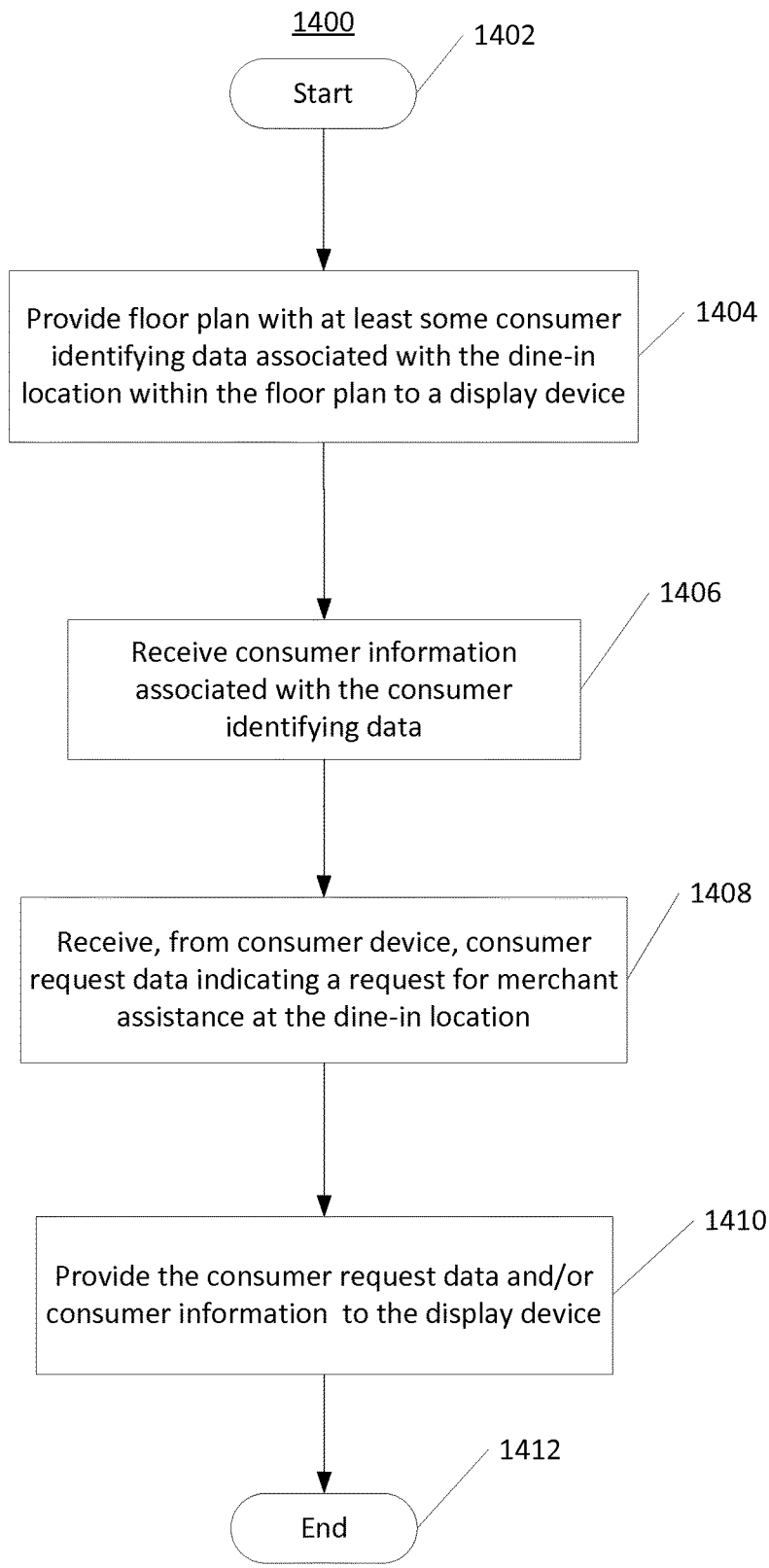
Figure 15:
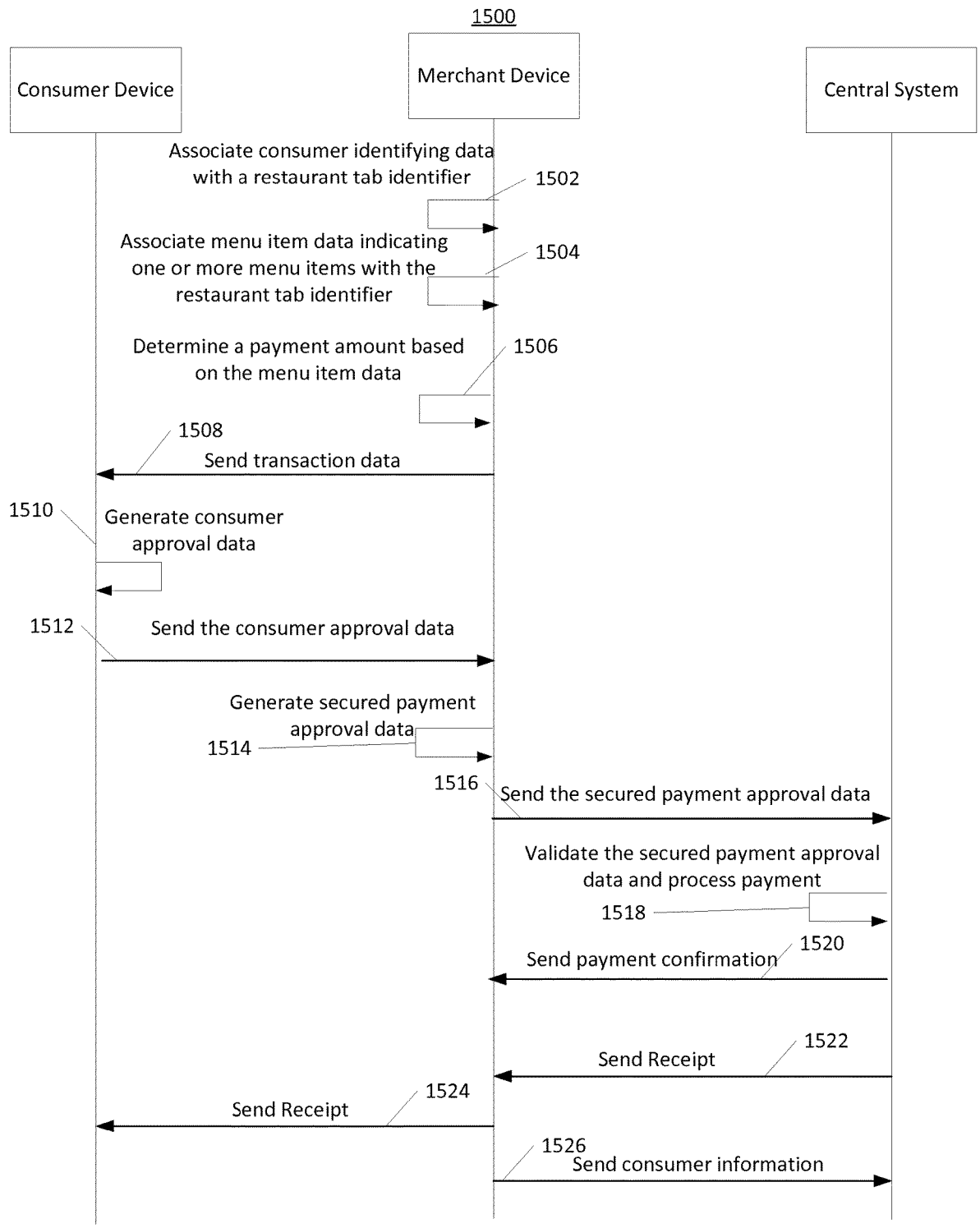
Figure 27:
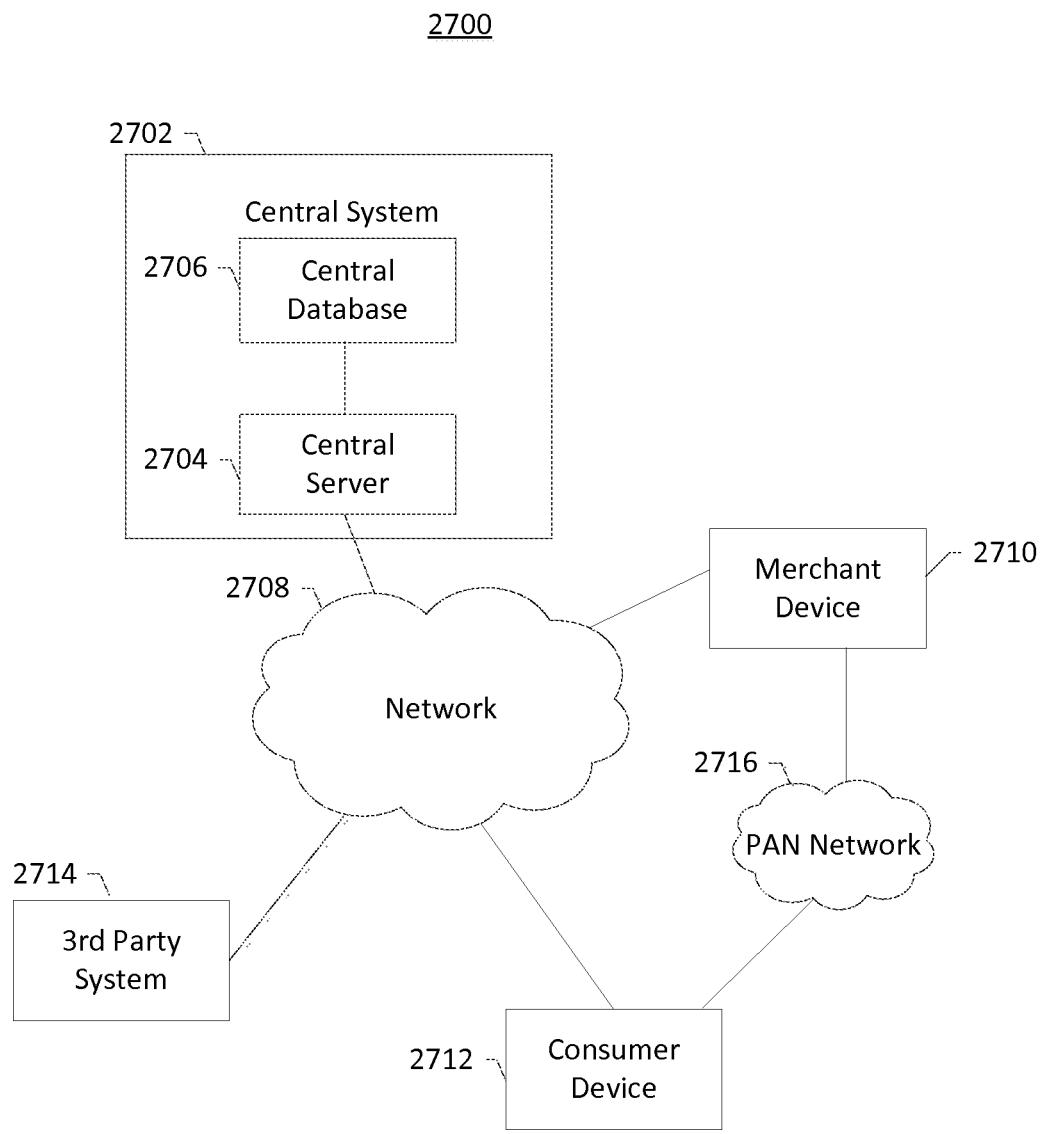
Figure 28:
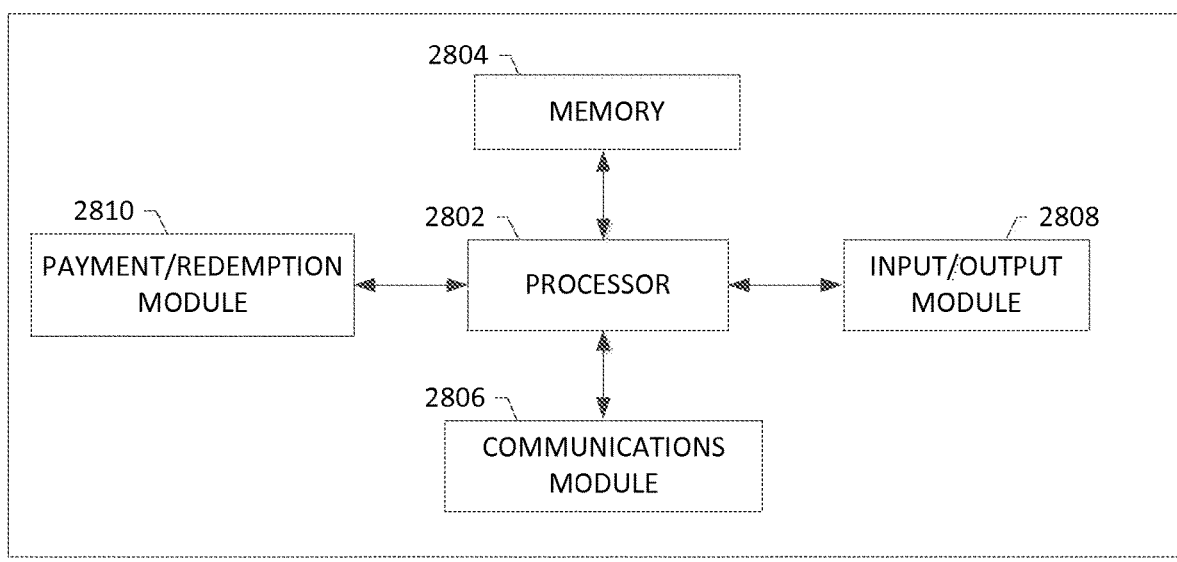

Having thus described some embodiments in general terms, reference will now be made to the accompanying drawings, which are not necessarily drawn to scale, and wherein:

FIG. 1a shows a flow chart of an example method for determining the presence of a consumer, performed in accordance with some embodiments;

FIG. 1b shows a flow chart of an example method for facilitating a financial transaction, performed in accordance with some embodiments;

FIG. 2a shows a flow chart of an example method for accessing a consumer payment account, performed in accordance with some embodiments;

FIG. 2b shows a flow chart of an example method for creating a consumer payment account, performed in accordance with some embodiments;

FIGS. 3-12 show example graphical user interface displays that may be presented by various components of systems, in accordance with some embodiments;

FIG. 13a shows a flow chart of an example data flow for associating a consumer with a dine-in location, performed in accordance with some embodiments;

FIG. 13b shows a flow chart of an example method for associating a consumer with a dine-in location, performed in accordance with some embodiments;

FIG. 14 shows a flow chart of an example method 1400 for facilitating consumer and merchant dine-in interactions, performed in accordance with some embodiments;

FIG. 15 shows a flow chart of an example data flow for facilitating transactions between a consumer and an employee, performed in accordance with some embodiments;

FIGS. 16-26 show example graphical user interface displays that may be presented by various components of systems, in accordance with some embodiments;

FIG. 27 shows an example system for facilitating interactions between employees and consumers, configured in accordance with some embodiments; and FIG. 28 shows an example schematic block diagram of circuitry, configured in accordance with some embodiments.

DETAILED DESCRIPTION

Embodiments will be described more fully hereinafter with reference to the accompanying drawings, in which some, but not all embodiments contemplated herein are shown. Indeed, various embodiments may be implemented in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like. Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

Overview

Embodiments discussed herein may be configured to allow a merchant device at a merchant's shop to communicate with a consumer device carried by a consumer to enhance consumer service. One example of a suitable type of merchant discussed herein is a dine-in restaurant. As such, while many of the example embodiments are described herein in the context of a dine-in restaurant, they may be readily extended to other types of merchants by a person of ordinary skill in the art. For example, some embodiments described herein may utilize a dine-in location (e.g., a table) at a restaurant but the techniques disclosed herein are also suitable to other units of location, such as a kiosk, aisle, information desk, display, counter, or the like at a retail store, restaurant, or any other type of merchant shop that serves consumers.

With reference to a restaurant, the merchant may identify the consumer via the consumer device when the consumer walks into the restaurant. Based on the consumer's preferences, which may be sent by the consumer or a central system (e.g., based on the consumer's identity), the consumer may be automatically placed into a virtual seating wait list. For example, the consumer may have a party of five people, and may be placed in line for a suitable dine-in location (e.g., a table for five).

When a suitable dine-in location becomes available, the merchant device may associate the consumer with a table. Furthermore, an alert may be sent to the consumer device that indicates table availability. While the consumer is seated, alerts and other information may be displayed on the merchant device to facilitate dine-in service. For example, information regarding consumer preferences for menu items (e.g., favorite foods, allergies, etc.) may be shown on a merchant device carried by a server as the server takes orders at the table. As such, the server may use this information in providing recommendations or customizing orders. In another example, the consumer may use the consumer device to request assistance from a server. An alert may be shown on the merchant device responsive to the request and the server may provide assistance accordingly.

The merchant device may also include point-of-sale (POS) functionality. For example, the merchant device may also be configured to assist in creating and managing restaurant tabs. As such, the server may enter menu items ordered by the consumer via the merchant device, such as via touch screen in a graphical user interface. The entered menu items may be sent to a ticket printer and/or sent to a display device (e.g., in a kitchen or bar) for menu item preparation. Furthermore, the merchant device may associate the entered menu items with the consumer's restaurant tab.

Some embodiments discussed herein may be configured to allow a consumer to provide payments to the merchant using the consumer device. For example, the consumer may send an indication to the merchant device that the meal is completed. To facilitate payment, the merchant device may send the restaurant tab (e.g., transaction data that includes a payment amount) to the consumer device. Rather than having to carry physical payment instruments, such as credit cards, currency, checks, and/or other items typically stored in a physical wallet, the consumer may make payments from a consumer payment account simply by carrying and/or using the consumer device.

Throughout the dine-in experience, the merchant device may be configured to collect consumer information that it learns from interactions with the consumer. As such, the consumer information may be leveraged by the merchant upon a subsequent visit to the restaurant by the consumer.

An advantage that may be realized by some embodiments discussed herein is that the consumer device can be configured to wirelessly communicate with the merchant device via a Personal Area Network (PAN) connection (e.g., via Bluetooth) or other unsecure direct connection. As such, the consumer device does not any an active internet connection (e.g., to the central system, merchant device, etc.) at the restaurant to facilitate the functionality discussed herein.

Some embodiments may provide for the securing of sensitive data (e.g., payment information or consumer information) to protect consumers and merchants from unauthorized devices on the PAN network or fraudulent transactions. For example, the consumer device may share wallet identifying data (or data secured with wallet identifying data), or wallet identifying tokens, with the merchant device via the PAN connection in lieu of unsecured sensitive data. The merchant device may send wallet identifying data received from the consumer device to the central system and receive consumer information from the central system via a secure connection. As such, the PAN connection is not used to exchange unsecured consumer information.

In another example, wallet identifying data and/or an associated private key may be used to secure or otherwise verify transaction data, for example, when the consumer is ready to make a payment. The consumer device may be configured to use the wallet identifying token and/or associated private key to sign (e.g., create an electronic signature or the like) the transaction data to form consumer approval data. The merchant device may generate secured payment approval data upon receipt of the consumer approval data. As discussed in greater detail herein, this "secured payment approval data" may be reveal little or no useful information to unauthorized devices who might intercept this signal. The merchant device may then send the secured payment approval data to the central system for processing of a financial transaction between the consumer and merchant.

Some other, but non-exhaustive, advantages that may be realized by some embodiments discussed herein include allowing a merchant to ensure that the consumer device user is in fact the real person authenticated to the consumer device, consumer device location tracking to facilitate service, allowing payments between two peer devices and/or providing promotional offerings (e.g., promotional vouchers, sales, discounts, rewards, or the like) to the consumer.

Consumer Presence Detection Overview

FIG. 1a shows a flow chart of an example method 100 for determining the presence of a consumer, in accordance with some embodiments. Method 100 is meant to show a high level example, while some of the other processes flows and other drawings discussed herein show more detailed examples. While other embodiments may operate differently, the examples discussed herein are largely focused on detecting the consumer's presence based on the consumer device being in communicable range with the merchant device. For example, both the consumer device and the merchant device may be running a Bluetooth-compliant protocol, such as Bluetooth v4, and/or be configured to establish/join any other type of PAN.

At 102, a central system may be configured to send wallet identifying data to a consumer device. The term "central system" as used herein refers to any marketing system, payment processing system, coupon provider system, and/or any other type of promotional system controlled by a merchant, third party and/or any other type of user (e.g., such as hardware provider, software application developer, online retailer, brick-and-mortar retailer, etc.). The central system may be accessible via one or more computing devices and may be operable to provide example promotion and/or marketing services on behalf of one or more providers that are offering one or more vouchers that are redeemable for goods, services, experiences and/or the like. The central system may be further configured to illustrate or otherwise inform one or more consumers of the availability of one or more vouchers (e.g., deals) in the form of one or more offers. In some examples, the central system may also take the form of a redemption authority or payment processor, it may provide rewards indications and/or it may function as an entity within a financial network. As such, the central system is, in some example embodiments, configured to present one or more offers, accept payments for offers from both merchants and consumers, upon acceptance of an offer, issue vouchers, indicate whether a voucher is valid for the purpose of redemption, generate rewards, provide a point of sale device or otherwise participate in the exchange of goods, services or experiences for currency and/or the like. In some embodiments discussed herein, the central system is referred to as a networked device.

The wallet identifying data may comprise, for example, one or more keys, random numbers, codes, and/or other types of tokens. As used herein, the term "random" includes pseudorandom or computationally generated numbers, keys, tokens, and the like. The wallet identifying data may be configured to be usable for identifying a particular consumer, a particular consumer device of the consumer, and/or a consumer payment account of the consumer configured to make payments.

The wallet identifying data may be used to encode and/or otherwise secure messages, or simply function as random data that has no meaning without having secure access to the central system and more particularly to a private key. Private information such as consumer identifying data, merchant data, financial data, transaction data, and/or other sensitive, non-random data may be secured and/or otherwise represented by the wallet identifying data, such that the wallet identifying data can be broadcast publically (e.g., over an unsecured PAN) while mitigating the risk that non-authorized users and/or devices might obtain sensitive financial information about the consumer, merchant, transaction, etc. For example, the wallet identifying data may be random data associated with the more sensitive, less random data, and the wallet identifying data can be transmitted over at least some types of communication links (e.g., unsecured or less secured wireless networks or direct connections) instead of the more sensitive, less random data. Additional details regarding wallet identifying data management, or wallet identifying tokens, that may be applicable to some embodiments are discussed in greater detail in U.S. patent application Ser. No. 13/764,753, entitled "Consumer Device Payment Token Management," incorporated by reference in its entirety above.

In some embodiments, the consumer device may be configured to broadcast the wallet identifying data it receives from the central system at 102 at some and/or all times. For example, whenever the consumer device is running a corresponding software application or otherwise set to broadcast (e.g., as the application runs in the background of the consumer device's operating system), the consumer device can be configured to broadcast and/or otherwise send the wallet identifying data at 104. As discussed above, the link between consumer device and the merchant device used to send the wallet identifying data can be an unsecure connection (such as a Bluetooth connection, public WiFi connection, near field communication connection, etc.) without unduly raising consumer privacy risks. Nonetheless, some embodiments may utilize a secure connection between the consumer device and the merchant device (e.g., Wired Equivalent Privacy (WEP), Wi-Fi Protected Access (WIPA), Wi-Fi protected Access version 2 (WPA2), etc.).

In some embodiments, the merchant device will only receive the wallet identifying data from the consumer device at 104 when the consumer device is in communicable proximity (e.g., within Bluetooth broadcast range) with the merchant device. Hence, when the merchant device receives the wallet identifying data from the consumer device, the merchant device and/or the central system can be configured to determine that the consumer device is physically located proximate the merchant device. For example, in one embodiment, the consumer may walk into a merchant shop while carrying the consumer device with an application running that causes the consumer device to broadcast the wallet identifying data. The consumer device may be configured to connect or pair with one or more merchant devices at 104, such as via a PAN (e.g., using Bluetooth) when the consumer device comes within a communicable range to the merchant device.

In some embodiments, the consumer device and the merchant device may communicate via the newly established connection or PAN and/or perform payment transactions without requiring that the consumer device have an active connection to the central system or some other payment processing system (e.g., via the Internet). The connection between the consumer device and the central system at 102 is not required to be active or otherwise available at 104. For example, mobile broadband connections between the consumer device and the Internet may become unavailable as the consumer device enters certain indoor merchant facilities and/or remote geographic locations.

When the merchant device establishes its own connection to the central system, which in some embodiments may be permanent or episodic, the merchant device may be configured to send the wallet identifying data to the central system at 106. In some embodiments, the merchant device and the central system may share a relatively secure connection when compared to that between the consumer device and the merchant device. In still other embodiments, a dedicated secure connection between the merchant device and the central system may be maintained.

At 108, the central system may be configured to send consumer identifying data (e.g., image data, consumer name, consumer account information) and/or any other type of consumer information (e.g., consumer preference data, consumer history data (e.g., indicating prior interaction with particular employees), purchase history, promotional deals, promotional vouchers of the merchant available for purchase by the consumer, promotional vouchers redeemable at the merchant, dine-in location preference data, or any other preference related information) to the merchant device. As discussed below, this information can be based on data uploaded directly from the consumer's device(s) to the central system and/or collected based on the consumer's interactions (e.g., either via the consumer device or some other device), with the merchant device and/or other devices such as with a promotional system, third party system and/or separate payment processing system.

As will be apparent to one of ordinate skill in the art in view of this disclosure, the above described method allows for consumer identifying data and/or other secure information to be received at a merchant device upon a consumer device coming within communication proximity to the merchant device. In this embodiment, the consumer identifying data is not transmitted from the consumer device directly to the merchant device via the relatively unsecure PAN connection to avoid its being intercepted and improperly used.

At 110, the merchant device may be configured to associate the consumer identifying data with a dine-in location. For example, if the merchant is a restaurant, the restaurant may provide dine-in locations represented by tables, rooms, floor regions, seats, or the like in which a consumer may be located while dining. The consumer may be associated with a particular dine-in location using one or more suitable techniques such as merchant assignment, dine-in location preference data of the consumer, consumer selection, and/or location-based tracking of the consumer device. As discussed in greater detail below, a variety of services may be provided to the consumer once the consumer's identity, consumer information, and dine-in location is known to the merchant device, and thereby also the merchant using the merchant device.

In some embodiments, different types of consumer information may be determined, received, and/or displayed on the merchant device throughout the consumer's dine-in experience. For example, table, party, and/or seating preference data may be used prior to the consumer being associated with a particular dine-in location, such as to place the consumer in a seating wait list and/or otherwise assign a dine-in location. Food preferences and/or menu item preferences may be sent and/or displayed subsequent to seating but prior to ordering to facilitate menu item ordering. These examples, as well as others, are described in further detail below.

Secure Payments Overview

FIG. 1b shows a flow chart of an example method 120 for facilitating a financial transaction between the consumer and the merchant, in accordance with some embodiments. Method 120 is meant to show a high level example, while some of the other processes flows discussed herein show more detailed examples. In some embodiments, the wallet identifying data may be further associated with and/or configured to be usable for identifying a consumer payment account. The consumer payment account may be configured to make payments, such as to a merchant account, an employee account, and/or any other type of suitable account configured to receive payments. While method 120 is described herein as being directed to payments from consumer to merchant, the consumer device and/or consumer payment account may also be configured to receive payments in some embodiments. In some embodiments, method 120 may be performed whenever a consumer customarily provides payment at a dine-in restaurant, such as upon the completion of a meal or after the ordering of menu items.

At 122, the merchant device may be configured to send a transaction data to the consumer device. For example, the transaction data may include a payment amount based on one or more menu items that are placed on a restaurant tab (e.g., as identified by a restaurant tab identifier). "Menu items," as used herein, may refer to any type of item that is available for purchase at a restaurant (e.g., food, drinks, customized orders, off-menu items, merchandise, services, special accommodations, etc.). The restaurant tab may be associated with the consumer, such as via the wallet identifying data and/or consumer identifying data. As such, the restaurant tab may also be associated with the dine-in location as described in method 100.

In some embodiments, the merchant device may be configured to receive menu item data indicating one or more menu items (e.g., via merchant input), associate the menu item data with the restaurant tab, determine the payment amount for the one or more menu items, and send the payment amount to the consumer device at 122. Additionally and/or alternatively, the consumer device may be configured to perform one or more of the functions related to generating the payment amount (e.g., order via consumer device).

At 124, the consumer device may be configured to send consumer approval data indicating approval of the proposed transaction (e.g., that which is embodied by the transaction data). As discussed below in greater detail, in some embodiments, the consumer device may be further configured to use wallet identifying data or a private key associated with the wallet identifying data to create the consumer approval data.

In one embodiment, this consumer approval data may consist of an electronic signature created by appending a private key associated with the wallet identifying data to a data string representing the transaction data and then performing an algorithmic transformation, such as a one way hash of the private key appended data string. In some embodiments, the wallet identifying data used at 124 may be the same as the wallet identifying data sent to the merchant device at 104 of method 100. The communication between the consumer device and the merchant device, as well as any and/or all direct communications between the consumer device and the merchant device, may use the PAN connection established at 104 of method 100. Alternatively or additionally, the consumer device may be configured to encrypt the transaction data and the consumer approval data using the private key At 126, the merchant device may be configured to generate and send secured payment approval data to the central system. The central system may use this information to determine whether to execute a payment by the consumer to the merchant. In some embodiments, the central system may be configured to validate or otherwise authenticate the secured payment approval data received from the merchant device. For example, the central system may be configured to validate and/or otherwise authenticate the secured payment approval data based on the wallet identifying token or associated private key (e.g., as sent to the consumer device at 102 of method 100 and later received from the merchant device). Alternatively or additionally, the central service may be configured to decrypt the transaction data and the consumer approval data using the private key in example embodiments in which the consumer device and/or the merchant device caused the consumer approval data, the secured payment approval data or the like to become encrypted.

If the central system validates the secured payment approval data, then a payment confirmation may be sent to the merchant device at 128. In some embodiments, a transaction receipt (e.g., information about the particular transaction) and/or other receipt information may be sent to the consumer device from the central system at 130A. The other receipt information can include, for example, a remaining balance and/or purchase power after the instant transaction (e.g., the amount of money until the consumer payment account reaches the applicable credit limit(s), the amount of money remaining in the consumer payment account after the transaction is processed, etc.), total spent over a given period of time (e.g., the amount of money spent in an hour, day, week, etc. including the instant transaction), total spent at a given merchant and/or location (e.g., amount of money spent at the merchant over a period of time, amount of money spent in a city over a period of time, etc.), and/or any other purchase-related information that may be of interest to the consumer subsequent to a transaction (including information that may help identify fraud and/or improper use of the consumer payment account).

In addition to or instead of the receipt being sent from the central system to the consumer device at 130A, a transaction receipt and/or other receipt information may be sent to the consumer device from the merchant device at 130B. The receipt information sent from the merchant device can be the same as or different than that sent at 130A, and/or can be independent of or based on receipt information generated by the central system. For example, the merchant device can be configured to send an independent receipt to the consumer device that the consumer can use to verify the receipt information sent from the central system at 130A. This may aid the consumer in confirming that the central system actually charged the payment amount (and/or help the consumer identify a discrepancy between the expected charge and the amount actually charged). As another example, the central system may also or instead send receipt information to the merchant device, which may then send the receipt to the consumer device.

Consumer Payment Accounts

FIG. 2a shows a flow chart of an example method 200 for accessing a consumer payment account, performed in accordance with some embodiments. Method 200 will be described with reference to example displays 300-1200 shown in FIGS. 3-12, respectively.

FIGS. 3-12 show example displays 300-1200 that may be presented by one or more display screens of one or more machines, such as those used by consumers, which are referred to herein as "consumer devices." A consumer device may be associated with a consumer and/or be carried by the consumer. The consumer device may be a mobile device such as a smartphone, tablet, laptop, payment device, user-identifying device, token device, PAN device, or the like.

In some embodiments, the merchant device may be a stationary device located at a counter, drive through, walk through, near an entrance, or the like. Alternatively and/or additionally, the merchant device may be a mobile device. The merchant device, when mobile, may be of a size and/or form that is easy to carry on a person, whether by hand or some other means (e.g., in a pocket, bag, etc.). Furthermore, the merchant device may include wireless communication capability and/or built-in power source(s) such that the carrier's movement is not encumbered by wiring.

In some embodiments, a restaurant may leverage multiple merchant devices. For example, two or more servers and/or other types of employees may each carry a merchant device in the course of business. For example, a server may visit various dine-in locations (e.g., tables) in the restaurant while carrying a merchant device to place consumers in the seating wait list, determine dine-in locations, take orders, provide menu information, accept payments, or the like. Furthermore, where a plurality of merchant devices is used, the merchant devices may be configured to share information with each other directly (e.g., in a peer-to-peer fashion) and/or via a central system. In some embodiments, a plurality of merchant devices may be strategically placed throughout the merchant's shop to provide coverage for location tracking of consumer devices.

In some embodiments, techniques similar to those described herein with respect to method 200 and FIGS. 3-12 may further be used for accessing a merchant and/or employee account configured to make and/or receive payments, such as via a merchant device.

While the example displays 300-1200 are configured to be shown on a smartphone (or other device having similar dimensions), similar interfaces may be utilized with other types of consumer devices discussed herein and modified accordingly (e.g., for screen size, input device compatibly, ease of use, etc.).

As discussed above, a merchant device or consumer device may refer to a mobile device or a stationary device in various embodiments. Example mobile devices may include a cellular telephone (including smartphones and/or other types of mobile telephones), laptop, wireless POS device, tablet, wireless computing device, or the like. Example stationary devices may include a desktop computer, work station, wired POS device, server, or the like.

In some embodiments, any suitable computing device may be configured to perform the functionalities described herein with respect to both merchant devices and consumer devices. For example, a device may be configured to make a payment (e.g., like a consumer device) and also receive a payment (e.g., like a merchant device), among other things described herein.

In some embodiments, the techniques described herein may be implemented via one or more applications that execute locally and causes a merchant/consumer device to be configured to function as a specialized machine. Additionally or alternatively, cloud-based, multi-tenant, thin-client, and/or other types of networked service techniques may be used. For example, one or more functionalities described herein as being performed by a merchant device or consumer device may execute on a remote device, such as a server and/or other networked machine. User input information may be generated by and sent from the merchant/consumer device to the remote device, while visual and/or audio information is sent from the remote device to the merchant/consumer device.

Figure 3:
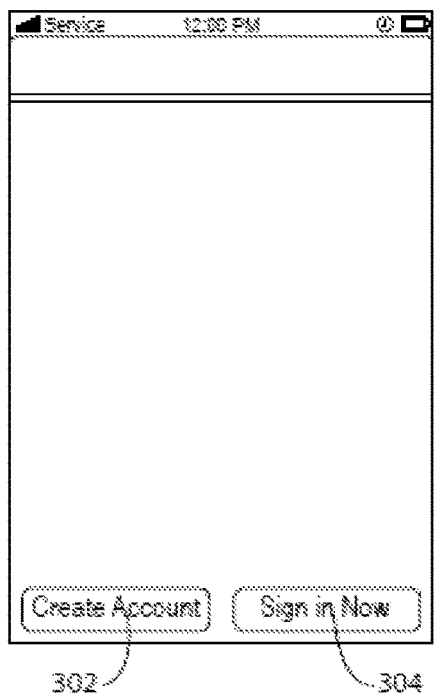

Turning back to FIG. 2a, method 200 shown therein may start at 202 and proceed to 204, where a consumer device may be configured to provide a login display. For example, FIG. 3 shows login display 300 that may be displayed by the consumer device. Login display 300, like some or all of the other displays discussed herein, may be accessed by virtually any method, such as an application executing locally. Alternatively and/or additionally, login display 300 may be accessed from one or more servers (e.g., central server 2704 shown in FIG. 27) via a web browser, such as by entering an address (e.g., a uniform resource locator ("URL") address) into the web browser's location bar. Login display 300 may be configured to allow a consumer to create a consumer payment account and/or sign in to an existing consumer payment account. As such, login display 300 may include create account selection 302 and sign in selection 304.

Figure 4:
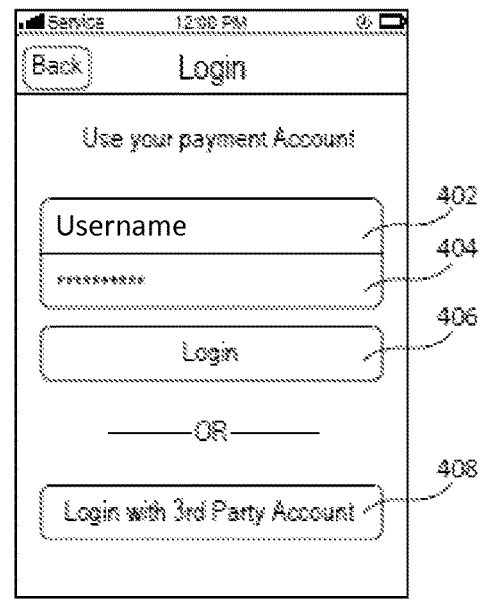

At 206, the central system may be configured to determine whether the consumer has provided login data for the consumer payment account. For example, the consumer may select sign-in selection 304 in login display 300 to indicate a desire to sign-in to a preexisting consumer payment account. In response, the consumer device may be configured to accept login data (e.g., a username, password, biometric identifier, etc.) for the consumer payment account. For example, login input display 400, as shown in FIG. 4, may be configured to accept the login data. The consumer may enter a username to username field 402, a password to password field 404, and submit information (e.g., to the central system) by selecting login selection 406. Alternatively and/or additionally, a pin number or some other form of identification or authentication may be used. As such, login data as used herein is not limited to embodiments that include a username and password.

If the consumer provides login data at 206, method 200 may proceed to 208. At 208, the central system may be configured to determine whether the login data is valid. For example, the login data received from the consumer device may be compared with login data stored in one or more databases (e.g., central database 2702 shown in FIG. 27).

In some embodiments, the central system may be configured to determine whether the consumer has provided third party login data for a third party account. For example, the consumer may select third party login selection 408 in login input display 400, which may allow the consumer to enter the third party login data (e.g., a username and password for the third party account).

The third party account may be any type of account that is provided by one or more third party servers (e.g., third party system 2712 shown in FIG. 27). As will be discussed in greater detail with respect to FIG. 2b, the consumer may associate one or more third party accounts with the consumer payment account, allowing the consumer to access the consumer payment account via the third party account (e.g., by logging in and/or otherwise authenticating with third party login data). Example third party accounts may include an email account, a social networking account, an account provided by a merchant, a banking account, etc.

If the employee provides the third party login data, a determination may be made as to whether the third party login data is valid at 208. For example, the central system may be configured to send the third party login data to an appropriate third party server/system (e.g., with a login request). The central system may be further configured to receive an indication regarding whether the login data is valid or invalid in response. As such, some embodiments may allow the consumer to access the consumer payment account via one or more different third party accounts and via providing third party login data.

If the login data is determined to be valid at 208, method 200 may proceed to 210, where the central system may be configured to provide access to the consumer payment account. As will be discussed in greater detail, the consumer device may be configured to, among other things, make payments via the consumer payment account, associate one or more payment destinations and/or sources with the consumer payment account, and/or view confirmations (e.g., receipts or summaries) of payments after receiving access to the consumer payment account.

If the login data is determined to be invalid at 208, method 200 may return to 206 where a determination may be made as to whether the consumer wants to make another attempt at providing login data for the consumer payment account. In some embodiments, the consumer payment account (e.g., as identified by username field 202) may be locked out after a certain number of unsuccessful login attempts.

Returning to 206, if the consumer does not provide login data, method 200 may proceed to 212. At 212, the central system may be configured to allow the consumer to create a new consumer payment account. As discussed above, the consumer may select create account selection 302 at login display 300. Responsive to the selection, the central system may be configured to provide interfaces (e.g., displays 500-1200 shown in FIGS. 5-12) to the consumer device for creating the consumer payment account, which will be described in further detail with respect to example method 220 shown in FIG. 2b. After creating the consumer payment account, the consumer device may be allowed to access the consumer payment account using method 200. Method 200 may end at 214.

Figure 5:
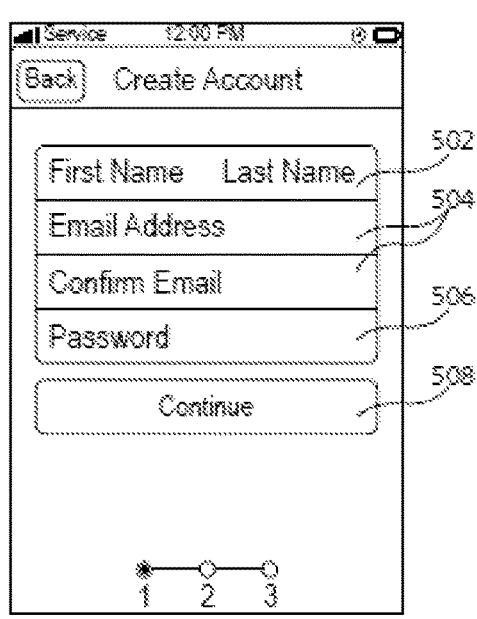
Figure 6:
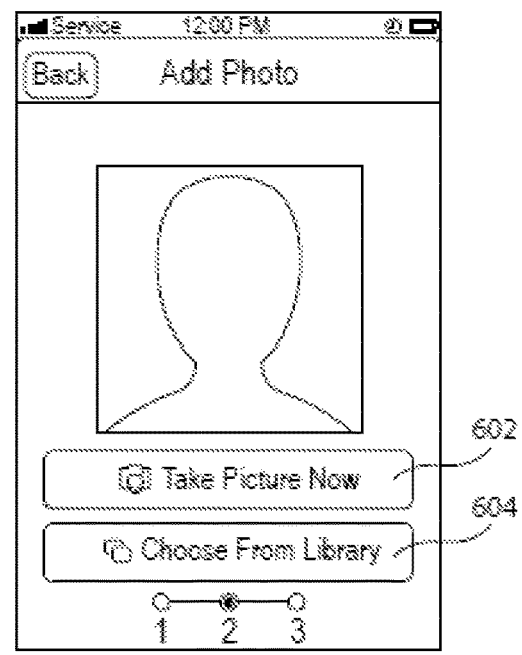

FIG. 2b shows a flow chart of an example of a method 220 for creating a consumer payment account, performed in accordance with some embodiments. Method 220 may begin at 222 and proceed to 224, where the central system may be configured to receive login data for the consumer payment account from the consumer device. FIG. 5 shows an example create account display 500 that may be presented by the consumer device, such as on a display screen. Create account display 500 may include name field 502, email address fields 504, and password field 506. In some embodiments, an email address entered into email address fields 504 may be used as the username for the consumer payment account (e.g., at username field 402, as shown in FIG. 4). Alternatively and/or additionally, the consumer may enter a username that is different from the email address. The consumer device may be configured to send the login data to the central system responsive to the consumer selecting continue selection 508.

In some embodiments, a different consumer device may be used to create the consumer payment account in method 220 than to access the consumer payment account in method 200. For example, the consumer device used to create the consumer payment account may be stationary device (e.g., a home desktop) of the consumer while the consumer device used to access the consumer payment account may be a mobile device. In another example, different mobile devices of the consumer may be used. For example, the consumer may own multiple consumer devices that may be used to create, access, and/or make payments with the consumer payment account.

At 226, the central system may be configured to associate the login data received from the consumer device with a consumer payment account. For example, associations between the login data may be stored in the one or more databases (e.g., central database 2706 shown in FIG. 27). As such, the consumer may provide the login data to receive access to the consumer payment account and/or associated data from any consumer device having access to the central system in some embodiments. In some embodiments, a consumer may use a single consumer device. For example, the consumer device may have a consumer device identifier that is also associated with the consumer identifying data and/or wallet identifying data at the central system such that devices that do not have the consumer device identifier are inoperable. Additionally and/or alternatively, multiple consumer devices with different consumer device identifiers may be associated with the consumer identifying data and/or wallet identifying such that the multiple consumer devices, but no other devices, may be used.

At 228, image data representing a picture of the consumer may be associated with the consumer payment account. For example, the consumer device may be configured to display add photo display 600 responsive to the consumer selecting continue selection 508 in create account display 500. In some embodiments, the consumer device may include and/or otherwise be configured to control an image capturing device. The image capturing device may be any device configured to be able to capture the image data, such as a camera, a webcam, video recorder, etc. As such, the consumer device may be configured to allow the consumer to capture the image data by selecting take picture selection 602. Additionally and/or alternatively, the consumer may be allowed to choose existing image data (e.g., an image taken at an earlier time and stored) for association with the consumer payment account, such as by selecting upload image selection 604.

Figure 7:
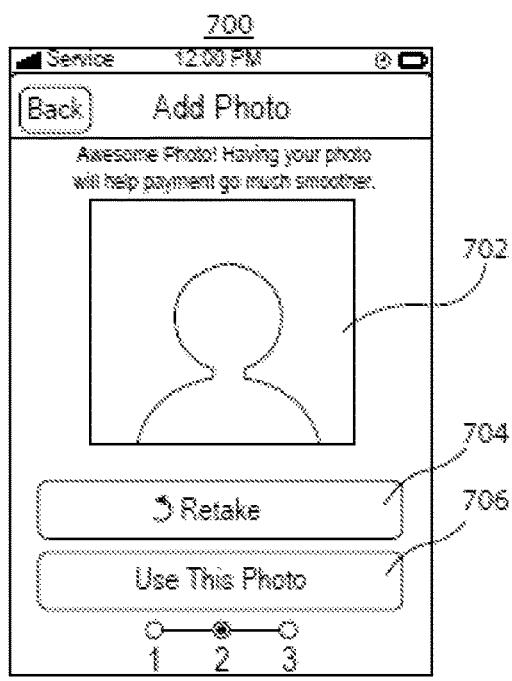

FIG. 7 shows an example confirm photo display 700 that may allow the consumer to review captured and/or existing image data, in accordance with some embodiments. For example, the image data may be shown at consumer image display 702. If the image data is unsatisfactory, the consumer may select retake selection 704, which may cause the consumer device to redisplay add photo display 600 in response. If the image data is satisfactory, the consumer may select use photo selection 706. The consumer device may be configured to send the image data to the central system responsive to the selection.

Returning to FIG. 2b, at 230, the central system may be configured to associate one or more payment sources with the consumer payment account. A payment consumer, as used herein, refers to an account that is configured to make payments. However, in some embodiments, the payment source may also be configured to receive payments.

In some embodiments, the payment source may be a financial account, such as a credit card account, checking account, debit account, direct deposit account, third party payment account, savings account, bank account, internet payment account, or the like. In that sense, "payment source," as used herein, may refer to any type of account capable of being associated with a currency balance (e.g., dollars, credits, etc.), receiving a payment that increases the balance, and/or providing a payment that decreases the balance.

Figure 8:
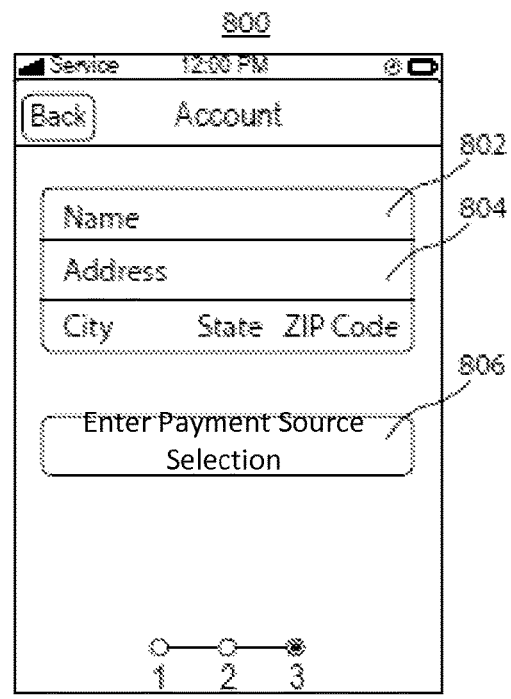
Figure 9:
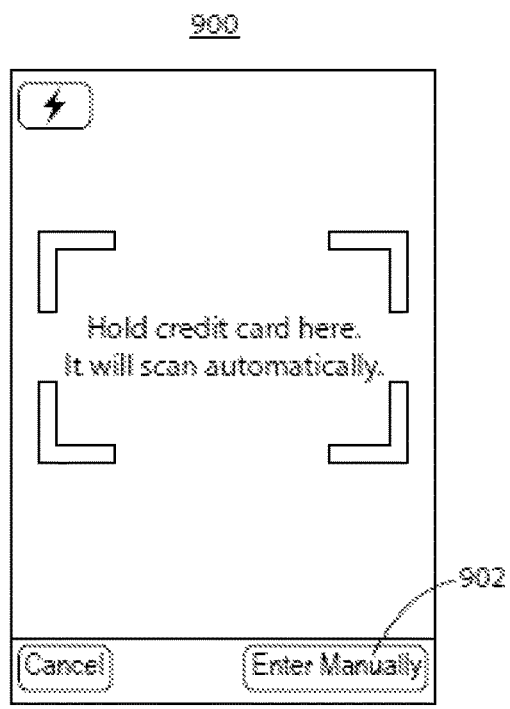

FIG. 8 shows an example add payment destination display 800 that may allow the consumer device to send account source data to the central system, in accordance with some embodiments. The consumer may enter a name and address at 802 and 804, respectively. The consumer may further select enter payment source selection 806, which may allow the consumer to enter a credit card account as a payment source. A credit card account is only an illustrative example, and the techniques disclosed herein may be applicable to other types of payment sources.

Upon selecting enter payment source selection 806, the consumer device may be configured to allow the consumer to scan a credit card. For example, the employee may hold a credit card to an image capturing device that may be configured to capture the credit card as image data, as shown in credit card capture display 900 in FIG. 9. The image data may be processed (e.g., using optical character recognition ("OCR")) to extract account source data such as credit card number, expiration date and/or credit verification value (or "CVV"), among other things (e.g., name, address, etc.). One example of software that may provide credit card capturing and account source data extraction with a mobile device camera is card.io. As discussed above, other payment sources may be used such as accounts associated with debit cards, checking accounts, online accounts, or payment cards in some embodiments. Furthermore, other techniques for automatically reading payment source data from tangible forms of payment may be used instead of, or in addition to, OCR. For example, a barcode reader device that reads magnetic data when the consumer swipes an instrument through the magnetic stripe reader device may be used.

Figure 10:
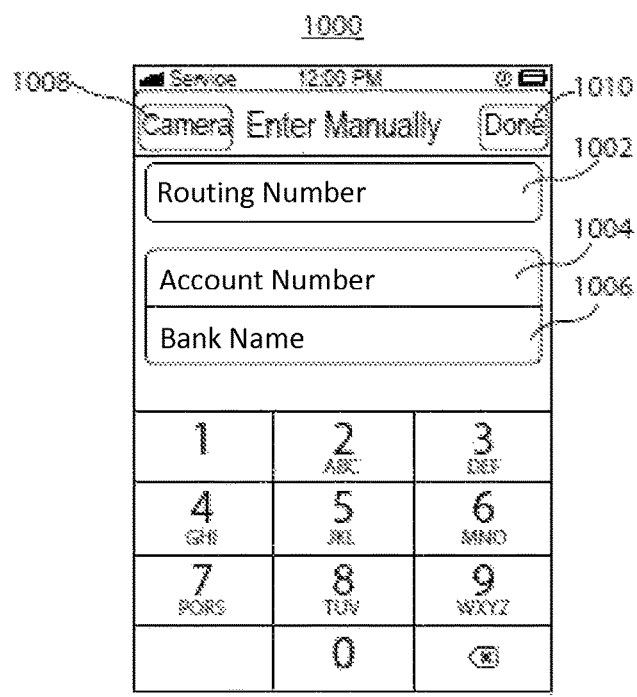

Additionally and/or alternatively, the consumer may select enter manually selection 902, which may cause the consumer device to display manual entry display 1000, as shown in FIG. 10. The consumer may enter account source data such as a routing number at 1002, an account number at 1004 and a bank name at 1006. In some embodiments, extracted account source data from the image data may be used to automatically populate these fields, allowing the consumer to correct any mistakes (e.g., an OCR error). The consumer may return to credit card capture display 900 via camera selection 1008. The consumer may also submit the entered account source data by selecting submit selection 1010.

Figure 11:
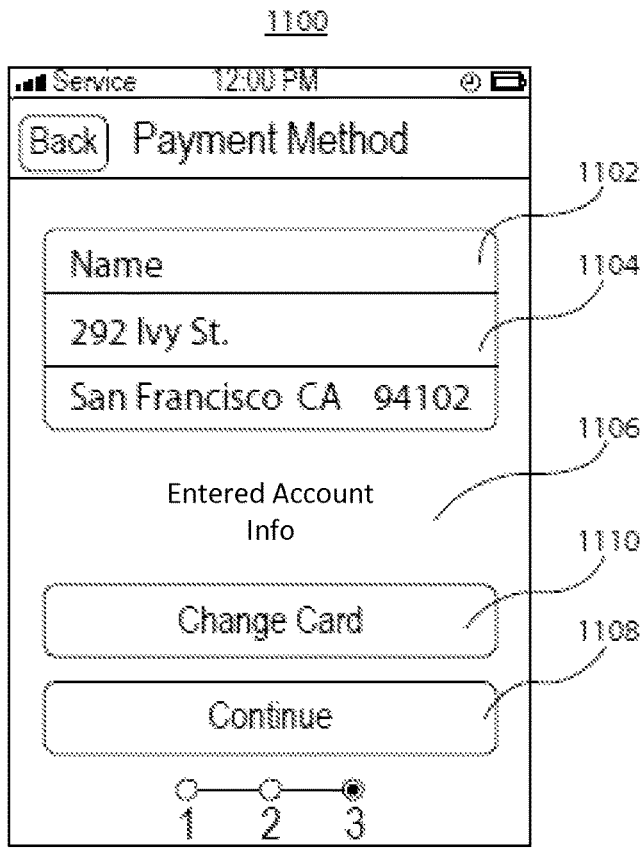

FIG. 11 shows an example confirm payment source display 1100, in accordance with some embodiments. Confirm payment source display 1100 may be shown, for example, after the central system has validated the account source and/or account source data. The consumer may add a payment source (and/or destination) and/or replace the payment source with a different payment source, such as by selecting change card selection 1110. The consumer may also indicate that the name at 1102, address at 1104, and/or entered account information at 1106 is correct by selecting continue selection 1108.

Returning to FIG. 2b, at 232, the central system may be configured to make a determination as to whether to associate one or more third party accounts to the consumer payment account. In some embodiments, connecting a third party account may allow a consumer to login to the consumer payment account via the third party account, as discussed above at 206 of method 200. Additionally and/or alternatively, third party account data (e.g., user profile, social network data, etc.) may be used to generate, at least in part, a consumer profile that may be presented to merchant devices. For example, the consumer may use third party account connection display 300 to associate a third party account (e.g., a social network account) by selecting connect account selection 1202 in registration completion screen 1200.

At 234, the consumer device may be configured to prompt the consumer for third party login data, which may be sent to the central system. The central system may be configured determine whether the third party login data is valid at 236, which may include communicating with a third party system/server.

Figure 12:
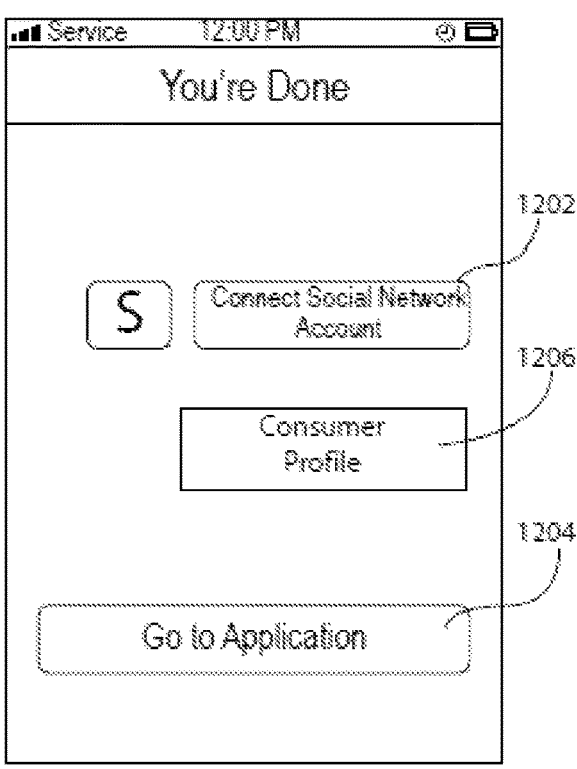

If the third party login data is valid, method 220 may proceed to 238, where the third party account may be associated with the consumer payment account. If the third party login data is invalid, method 220 may return to 232, to determine whether the consumer is still interested in connecting a third party account. If the consumer is not interested in associating a third party account with the consumer payment account, method 220 may end at 240. After consumer payment account creation, the central system may be configured to provide access to the consumer payment account, associated data, and/or functionality. For example, the consumer may select go to application selection 1204 in registration completion screen 1200, as shown in FIG. 12.

As discussed above, the consumer may be associated with a consumer profile that includes consumer information. In some embodiments, some or all of the consumer information may be viewable by merchants, such as an employee in the course of providing consumer assistance. Therefore, the consumer device and/or central system may be configured to allow the consumer to keep a separation between third party account information (e.g., personal social network information) and the consumer profile. For example, only limited types of data, such as consumer name, may be used in generating the consumer profile. Furthermore, the consumer may choose not to connect any third party account. In some embodiments, the consumer may select consumer profile selection 1206 in registration completion screen 1200 to create and/or edit the consumer profile (e.g., regardless of whether there is a connected third party account).

Dine-in Location Functionality

FIG. 13a shows a flow chart of an example data flow represented by method 1300, which can result in associating a consumer with a dine-in location, performed in accordance with some embodiments. Method 1300 may be performed by a consumer device (e.g., consumer device 2712 shown in FIG. 27), a merchant device (e.g., merchant device 2710) and one or more networked machines (e.g., central server 2706). In some embodiments, method 1300 may be performed after a consumer has logged in and/or otherwise authenticated with the central system to access a consumer payment account configured to make payments, as discussed above in connection with method 200.

At 1302, the central system may be configured to send wallet identifying data (with corresponding private keys) to the consumer device. As such, the consumer device may be configured to store the wallet identifying data. "Wallet identifying tokens" or "wallet identifying data," as used herein, may refer to any type of data that may be used to secure data transfers between the consumer device and the merchant device and enable the consumer device to cause the merchant device to receive secure information about the consumer (and/or the consumer's payment account) from the central system. For example, wallet identifying data may include, or may be based at least partially on, a random or pseudorandom code, number, etc., generated by the central system. In various embodiments, the central system may be configured to associate the wallet identifying data with consumer identifying data that identifies a consumer, a consumer device and/or a consumer payment account. This association may be stored to a memory or database that is accessible by the central system.

In some embodiments, the wallet identifying data may be associated with a private key. For example, the wallet identifying data may be configured to be usable as a public key that may be passed to other devices (e.g., a consumer device, a merchant device, a central system, etc.) to validate or authenticate various types of data. The private key may be used by the central system to correlate wallet identifying data (e.g., a wallet identifying token) with consumer identifying data and to validate and/or otherwise verify secured payment approval data such that the data may be relied upon as authentic and, thus, processed or otherwise used. The private key may be kept secret by the central system and/or securely shared with only devices (e.g., consumer devices) authorized to use wallet identifying data and private keys as discussed in greater detail herein. In some embodiments, a wallet identifying data and a corresponding private key may be generated together and/or mathematically related such that determining the private key from the wallet identifying token (and vice versa) is very difficult, if not impossible, and extremely time consuming or prohibitively expensive.

In some embodiments, some or all of the messages sent by the consumer device to the merchant device (e.g., via an unsecured direct wireless connection) may be secured with wallet identifying data. Messages that are signed with the wallet identifying data and/or a private key (e.g., the wallet identifying data and/or private key is appended or otherwise included with the message) may be used to identify the message sender and/or to authenticate the message sender (e.g., to prove that the sender is identified correctly). For example, if the central system receives a signature from a merchant device in association with a proposed consumer device payment that does not match valid (e.g., non-expired or otherwise expected) wallet identifying data previously sent to the consumer device, the payment may be denied.

In various embodiments, wallet identifying data and/or private keys may be used for a number of purposes including identifying a consumer, sending secure data, identifying a consumer payment account, signing messages by the consumer device that demonstrate consumer consent (e.g., for a payment), proving authenticity of messages, and/or encrypting messages.

Wallet identifying data (and associated private keys) may be sent to the consumer device at virtually any time. For example, the consumer device may be a smart phone that is configured to download an application from the central system (e.g., an online store of smart phone applications), and the downloading, installation and/or execution of the application can cause the consumer device to receive the wallet identifying data. Additionally and/or alternatively, wallet identifying data may be downloaded by the consumer device at a later time, such as at the consumer's request, at the creation of a consumer payment account, via a central system push, on a schedule basis (e.g., each day, each hour, each month, etc.), upon entering a certain proximity to a merchant device, upon establishing a connection with the central system, in the course of a transaction, upon the occurrence of a specified event or condition, combinations of the above. etc. In some embodiments, new wallet identifying data may replace and/or be added to existing wallet identifying that is stored in the consumer device. This refreshing of wallet identifying data may ensure additional security, for example, because wallet identifying data may be time-stamped or otherwise may be allowed to expire or become inoperable at the central system, merchant device, and/or consumer device. In some embodiments, some or all of the discussion herein regarding wallet identifying data may also apply to merchant identifying data and merchant devices.

At 1304-1308, the consumer device and the merchant device may be configured to form a connection. In some embodiments, the connection may be formed without the consumer device and/or the merchant device having active Internet access at the time of the connection (e.g., an active connection to the central server). For example, the connection may be a wireless connection over a PAN (e.g., via PAN network 2416 shown in FIG. 24). Some suitable PAN protocols may include Bluetooth, Infrared Data Association (irDA), wireless USB, ZigBee, WiFi, and Z-Wave. In some embodiments, other types of connections between the consumer device and merchant device, such as direct wire, Internet, near field communications and/or radio frequency identification technologies, may be used. A "PAN connection," as used herein, may refer to any direct connection between the consumer device and the merchant device (e.g., via network 2716 rather than network 2708, as shown in FIG. 27). Similarly, a "PAN," as used herein, may refer to any suitable network for the direct connection.

Figure 19:
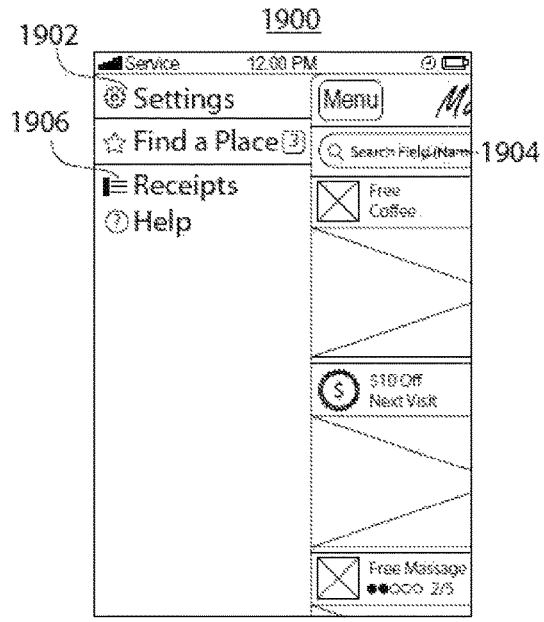

Depending on the protocol used, at 1304, the consumer device may begin announcing a consumer service to other devices, such as the merchant device. For example, a process and/or application may configure the consumer device to broadcast (e.g., via Bluetooth) one or more suitable messages. FIG. 19 shows an example consumer service menu display 1900 that may be displayed on the consumer device. The consumer may use settings selection 1902 to enable or disable the announcing of the consumer service.

In some embodiments, the consumer service may include one or more background processes that may run while the consumer device is locked, in a low-power mode, and/or executing other applications in the foreground. In some embodiments, the one or more broadcasted messages may include wallet identifying information and/or be encrypted using wallet identifying information.

At 1306, the merchant device may begin discovering the consumer service. For example, a process and/or application may execute on the merchant device that configures the merchant device to discover other devices, such as the consumer device, that are currently announcing the consumer service. In some embodiments, discovery of the consumer service by the merchant device may be initiated after an employee has logged in, authenticated, or otherwise enabled such functionality on the merchant device.

In some embodiments, the consumer device may be configured to discover the consumer service while the merchant device may be configured to announce the consumer service. Additionally and/or alternatively, both devices may be configured to be capable of announcing and discovering the consumer service. For example, both devices may discover compatible devices and/or be discovered by compatible devices.

At 1308, a connection between the merchant device and the consumer device may be created. For example, the consumer device and merchant device may come within a certain discovery range, such as when a consumer carrying the consumer device enters the merchant's shop. In some embodiments, the discovery range may be set by the merchant device and/or the consumer device and/or by the range at which the devices can be located from each other and still be able to communicate (e.g., Bluetooth capable devices may have a communicable range between 10 and 100 meters, depending on the type of device(s) being utilized).

In some embodiments, some or all of the messages used to form the connection between the consumer device and the merchant device at 1304-1308 may be encrypted and/or signed. For example, messages sent from the consumer device may be encrypted and/or signed with wallet identifying data. Additionally and/or alternatively, messages sent from the merchant device may be encrypted and/or signed with merchant identifying data and/or received wallet identifying data. In some embodiments, messages used to form the connection may not include any confidential information. Such messages, for example, may be left unsecured.

At 1310, the consumer device may be configured to send the wallet identifying data to the merchant device. For example, the wallet identifying data may be used as a secure reference for requests by the merchant device to the central system for additional consumer data. In some embodiments, the consumer's name, URL for accessing the image data representing a picture of the consumer (e.g., as associated with the payment account at 210 of method 200), the image data itself, and/or other suitable consumer identification information may be sent with the wallet identifying data (e.g., as one or messages that are encrypted, signed, or simply unsecured). In some embodiments, the wallet identifying data sent to the merchant device at 1310 may be one of multiple wallet identifying data that the consumer device received from the payment server at 1302.

As discussed above, the wallet identifying data may provide a reference to consumer data (e.g., consumer identifying data and/or consumer-related data) available from the central system. As such, the wallet identifying data may be sent to the merchant device in place of actual consumer data that may be readily stolen by an unauthorized device via the PAN connection. Furthermore, the central system may be configured store the wallet identifying data in association with consumer identifying data, consumer payment account data, a consumer device identifier, and/or other consumer-related data prior to sending the wallet identifying data to the consumer device at 1302.

Figure 20:
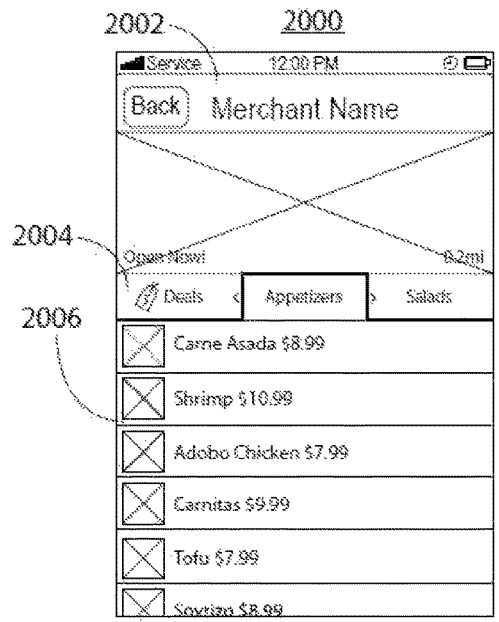

At 1312, the merchant device may be configured to send merchant data to the consumer device. For example, the merchant data may include merchant identifying data, or other data, that indicates the merchant's identity to the consumer device. The merchant data may further include information about the merchant, such as menu items, items for sale (e.g., products, services, etc.), promotional deals, promotional vouchers of the merchant available for purchase, purchased promotional vouchers redeemable at the merchant, sales, etc. FIG. 20 shows an example merchant main display 2000, in accordance with some embodiments. Merchant main display 2000 may be shown on the consumer device at 1312 and may include the merchant data, such as merchant name at 2002, deals at 2004, and menu items at 2006. In some embodiments, some or all of the merchant data may be stored in central database 2702 and provided to consumer device 2712 via merchant device 2710, as shown in FIG. 27.

Additionally and/or alternatively, the consumer device may access merchant main display 2000 and/or its data via the central system (e.g., at the merchant shop or otherwise). For example, some or all of the merchant data may be provided to consumer device 2712 via network 2708, as shown in FIG. 27. In some embodiments, a consumer may search and/or browse a list for merchants (e.g., using search field 1904 of consumer service menu display 1900). Upon selecting a particular merchant, a merchant main display 2000 for the merchant may be shown on the consumer device. In some embodiments, the merchant data sent from the merchant device at 1312 may include merchant identifying data but no additional merchant information. As such, the consumer device may be configured to request the additional information from the central system based on the merchant identifying data.

At 1314, the merchant device may be configured to establish a secure connection with the central system (e.g., via network 2708 shown in FIG. 27). For example, an employee may provide login data to the central system that may be used to identify and authenticate the employee and/or merchant. As discussed above, the secure connection between the merchant device and the central system may be established at any suitable time, such as before the merchant device has connected with the consumer device at 1308, or before the consumer device enters within communicable proximity to the merchant device. In some embodiments, the merchant device may connect to the central system via a local area network (LAN) (e.g., via one or more wireless routers for mobile devices or Ethernet if the merchant device is wired) that is connected to the Internet. Additionally and/or alternatively, the merchant device may connect to the central system without using a local access point, such as via a mobile broadband connection.

At 1316, the merchant device may be configured to send the wallet identifying data received from the consumer device at 1310 to the central system. For example, the wallet identifying data may be sent via the secure connection established at 1314. As discussed above, the wallet identifying data may be used by the central system to identify the consumer, consumer device, and/or the consumer payment account associated with the consumer.

At 1318, the central system may be configured to validate the consumer, such as by using the wallet identifying data. For example, the central system may determine whether the wallet identifying data sent to the consumer device at 1302 matches or otherwise corresponds with the wallet identifying data received from the merchant device at 1316. In some embodiments, the central system may be configured to ensure that the wallet identifying data received from the merchant device at 1316 originated from a consumer device (e.g., at 1310) that is authorized to use the consumer payment account. As discussed above, authorized consumer devices may include consumer device identifiers that are associated with the wallet identifying at the central system. As such, the consumer device may also be configured to send a consumer device identifier to the merchant device and the merchant device may be configured to send the consumer device identifier to the central system.

In some embodiments, the central system may be configured to extract some or all of the consumer data (e.g., the consumer's identity) from the wallet identifying data (e.g., by using one or more tokens or keys that correspond with the wallet identifying data), such as when the consumer device used the wallet identifying data to encode consumer data or otherwise attached with consumer data with the wallet identifying data.

At 1320, the central system may be configured to send consumer identifying data associated with the wallet identifying data to the merchant device. In some embodiments, the consumer identifying data may include image data, consumer name, a consumer identifier, or the like that may be kept secure by the central system (e.g., rather than being stored in the consumer device and sent over the PAN connection to merchant devices). As discussed above, the association between the wallet identifying data and the consumer identifying data (as well as consumer-related data or other data of the consumer) may be stored in one or more databases (e.g., central database 2702 shown in FIG. 27). As such, the central server may be configured to request the consumer identifying data from the central database based on the wallet identifying data received from the merchant device.

In some embodiments, the merchant device may be configured to receive other types of consumer data from the central system at 1320. The consumer data may include, for example, consumer profile data, consumer payment account data, dine-in preference data, third party account data, menu item purchase history data, social network data, consumer preference data, promotional vouchers of the merchant available for purchase, promotional vouchers redeemable at the merchant, etc. As will be discussed in further detail below, some or all of the consumer data may be further used to enhance the consumer's dine-in experience.

In some embodiments, the merchant device may be further configured to send some of the consumer information received from the central system to the consumer device. Additional details regarding deal vouchers and rewards that may be sent to the consumer device in some embodiments are discussed in U.S. Provisional Patent Application No. 61/715,230, entitled "Consumer Presence Based Deal Offers," incorporated by reference in its entirety above.

At 1322-1328, the consumer (e.g., via consumer identifying data and/or wallet identifying data) may be associated with a dine-in location. A dine-in location, as used herein, refers to a unit of location that may be assigned to a consumer, group, and/or restaurant tab. For example, a dine-in location may be a table at a restaurant that includes a plurality of tables, each table being a different dine-in location. Here, each table may be uniquely identified with a table identifier that may be associated with consumer, group, and/or restaurant tab identifier. Other types of dine-in locations may include, for example, individual seats, bar stools, or the like.

At 1322, the consumer device may be configured to send dine-in location preference data. The dine-in location preference data may be used to place the consumer in a seating wait list in accordance with consumer preference. The seating wait list, as used herein, refers to a list of consumers (or groups) that are waiting for an available dine-in location. For example, restaurants that are particularly busy may not have sufficient seating to meet full demand at all times. As such, the merchant device may be configured to place consumers on the seating wait list. For example, the merchant device may be configured to manage seating wait list data that includes queue of consumers (e.g., as identified by consumer identifying data and/or wallet identifying data). In some embodiments, the merchant device and/or central system may be configured to send a request for the dine-in location preference data to the consumer device.

The dine-in location preference data, for example, may include any information that may be used in placing the consumer and/or associated party into a suitable and/or preferred position within the seating wait list. As such, the consumer device may be configured to send, as dine-in location preference data, the number of people in the consumer's party, the number of adults, number of children, preferred seating type (e.g., table, barstool, window seat, booth, location within restaurant, television-viewing, balcony, porch, indoor, outdoor, smoking, non-smoking, etc.), among other things. In some embodiments, dine-in locations may each be associated (e.g., via table identifiers if the dine-in locations are tables) with properties such that the dine-in locations may be matched based on the dine-in location preference data. For example, a dine-location may have a capacity property which indicates the maximum number of consumers that may be seated at the dine-in location. As such, dine-in location preference data that indicates a group of four can be matched with dine-in locations that have a capacity of at least four consumers.

In some embodiments, the merchant device may be configured to receive some or all of the dine-in location preference data from the central system. The central system may be configured to store dine-in location preference data preference data received from prior interactions with a consumer device and/or merchant device. For example, dine-in location preference data may be associated with the wallet identifying data and/or consumer identifying data at the central system.

At 1324, the merchant device may be configured to update the seating wait list data. For example, when a dine-in location becomes available, the seating wait list data may be updated accordingly. A suitable consumer (e.g., based on the dine-in location preference data) may be moved up in the queue. Furthermore, consumers may indicate a change in their dine-in location preference data (e.g., change in party size, preferred location, cancelation, etc.), which may be used to update the seating wait list. In some embodiments, the merchant device may be configured to leverage a plurality of queues. For example, seating for two may have a different queue than seating for six, or the like.

At 1326, the merchant device may be configured to determine a dine-in location for the consumer. For example, when the consumer reaches the top of the queue for a suitable dine-in location, the consumer may be assigned to the dine-in location. As such, the seating wait list data may be updated accordingly to reflect that the consumer is no longer waiting to be seated.

At 1328, the merchant device may be configured to send an indication of available seating to the consumer device. For example, the merchant may provide for a lobby or other waiting area within which the consumer may wait for seating. When seating becomes available, the indication as such may be sent to the consumer device. Method 1300 may then end.

In some embodiments, the consumer device may be configured to allow the consumer to order one or more menu items while the consumer is waiting in the seating wait list. For example, the consumer device may be configured to access the menu via the connection with the merchant device and/or via the Internet (e.g., with the central system). Furthermore, one or more promotional offers (e.g., on sale menu items, limited time items, reward tracking items, etc.) may be presented to the consumer device. Techniques for providing online ordering of menu items are discussed further in U.S. patent application Ser. No. 13/657,728, entitled "Facilitating Online Transactions," incorporated by reference in its entirety above.

FIG. 13b shows a flow chart of an example method 1330 for determining a dine-in location, performed in accordance with some embodiments. The merchant device may be configured to determine the dine-in location based on the location of the consumer device. For example, some restaurants may leverage consumer self-seating (e.g., method 1300 at 1322-1328 is not performed) and/or allow a consumer to relocate to a different dine-in location (e.g., method 1330 may be performed after method 1300).

Method 1330 may begin at 1332 and proceed to 1334, where the merchant device may be configured to receive one or more wireless communications from the consumer device. In some embodiments, any of the communications discussed herein between the merchant device and consumer device, such as via the PAN connection or any other suitable connection, may be used. In some embodiments, multiple merchant devices and/or other devices may be used. For example, the multiple merchant devices may be strategically placed to act as nodes that provide sufficient coverage within the restaurant.

At 1336, the merchant device may be configured to determine location data based on the one or more wireless communications received from the consumer device. The location data, for example, may be determined based on communications between the consumer device and a plurality of merchant devices strategically placed within the restaurant to provide sufficient geographic coverage. As such, techniques such as triangulation, received signal strength indication (RSSI) data, and/or the like may be used to determine the location data. The communications from the consumer device to the plurality of merchant devices may be via the PAN connection (e.g., Bluetooth).

In some embodiments, a dine-in location may include a location device located at and/or near the dine-in location and configured to communicate with the consumer device to determine the location data. Techniques such as radio frequency identification (RFID), near field communication (NFC), Quick Response (QR) code, RSSI, wireless local area network (WLAN), ZigBee, or the like may be used. A location device (e.g., a merchant device or other suitable type of device of the merchant) may be located each, or a plurality of, dine-in locations. For example, the consumer device may be configured to generate and display a QR code that may be scanned with a location device at a dine-in location. Additionally and/or alternatively, the location device may be configured to automatically detect the consumer device when the consumer device comes within a certain proximity to the location device at a dine-in location, such as via NFC, RSSI, or RFID.

At 1338, the merchant device may be configured to determine the dine-in location based on the location data. For example, the merchant device may be configured to match the dine-in location that is nearest to the location indicated by the location data. Furthermore, the merchant device may utilize existing dine-in location information, such as by removing dine-in locations associated with other consumers from a pool of possible dine-in locations.

In some embodiments, the consumer device may be configured to determine the location data (e.g., based on communications received from one or more merchant devices) and send the location data to the merchant device. Here, the merchant device may be configured to determine the dine-in location based on the location data received from the consumer device.

FIG. 14 shows a flow chart of an example method 1400 for facilitating consumer and merchant dine-in interactions, performed in accordance with some embodiments. As such, method 1400 may be performed after method 1300 and/or 1330, such as after the consumer has been associated with a dine-in location.

Figure 16:
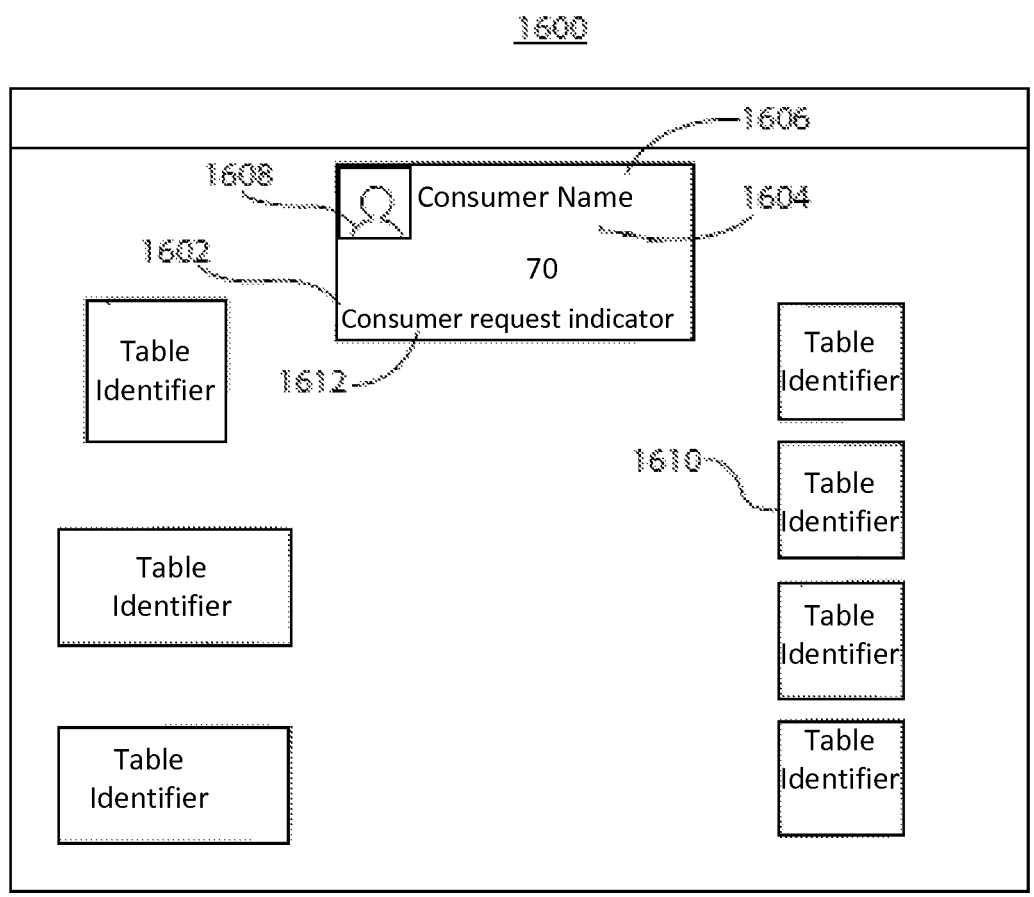

Method 1400 may start at 1402 and proceed to 1404, where the merchant device may be configured to provide a floor plan, with at least some consumer identifying data associated with the dine-in location within the floor plan, to a display device. FIG. 16 shows an example floor plan display 1600 that may be displayed on the display of the merchant device. In some embodiments, floor plan display 1600 may be part of a graphical user interface that may also be configured to provide, among other things discussed herein, POS functionality.

Floor plan display 1600 includes a plurality of dine-in locations shown in a graphical layout as tables, where each table is identified with a table identifier. For example, table 1602 is shown with table identifier 1604 having a value of 70. Furthermore, table 1602 is includes consumer identifying data such as consumer name at 1606 and consumer image at 1608. The other shown dine-in locations, such as table 1610 does not include consumer identifying data, which may indicate that the table is not associated with a consumer (e.g., available for seating).

At 1406, the merchant device may be configured to receive consumer information associated with the consumer identifying data. For example, the consumer information may be sent from the central system. Alternatively and/or additionally, the consumer information may be received from the consumer device. The consumer information received at 1406 may include any type of data that may be suitable, useful, or helpful in providing service to the consumer while seated at the dine-in location. Example consumer information may include, but is not limited to, dine-in preference data configured to facilitate customized dining service, menu item preference data (e.g., favorite menu items, drinks, allergies, etc.), consumer history data (e.g., indicating prior interaction with particular servers), purchase history, promotional vouchers available for purchase, purchased promotional vouchers redeemable, recommended menu items, table setting preference data, etc.

At 1408, the merchant device may be configured to receive, from the consumer device, consumer request data indicating a request for merchant assistance at the dine-in location of the consumer. In some embodiments, the consumer request data may be transmitted wirelessly, such as via the PAN connection between the consumer device and the merchant device. The consumer request data may indicate, for example, that the merchant is requested for a variety of reasons. The merchant may leverage the received consumer request data to send an employee (e.g., a server) to the dine-in location. Additionally, the consumer request data may indicate the nature of merchant assistance that is required. For example, consumer request data may further indicate that the consumer is ready to pay the restaurant tab and/or requires a beverage refill, additional utensils, napkins, etc. As such, the merchant may bring requested items to the dine-in location without having to make a preliminary information gathering visit.

At 1410, the merchant device may be configured to provide the consumer request data and/or consumer information to the display device. As such, a merchant that is viewing the display device may use the displayed data to assist the consumer accordingly. In some embodiments, the consumer request data and/or consumer information may be displayed in a common user interface and/or graphical display as floor plan display 1600. As shown in FIG. 16, table 1602 in floor plan display 1600 includes consumer request indicator 1612, which indicates that the merchant device has received consumer request data from the consumer device.

Figure 17:
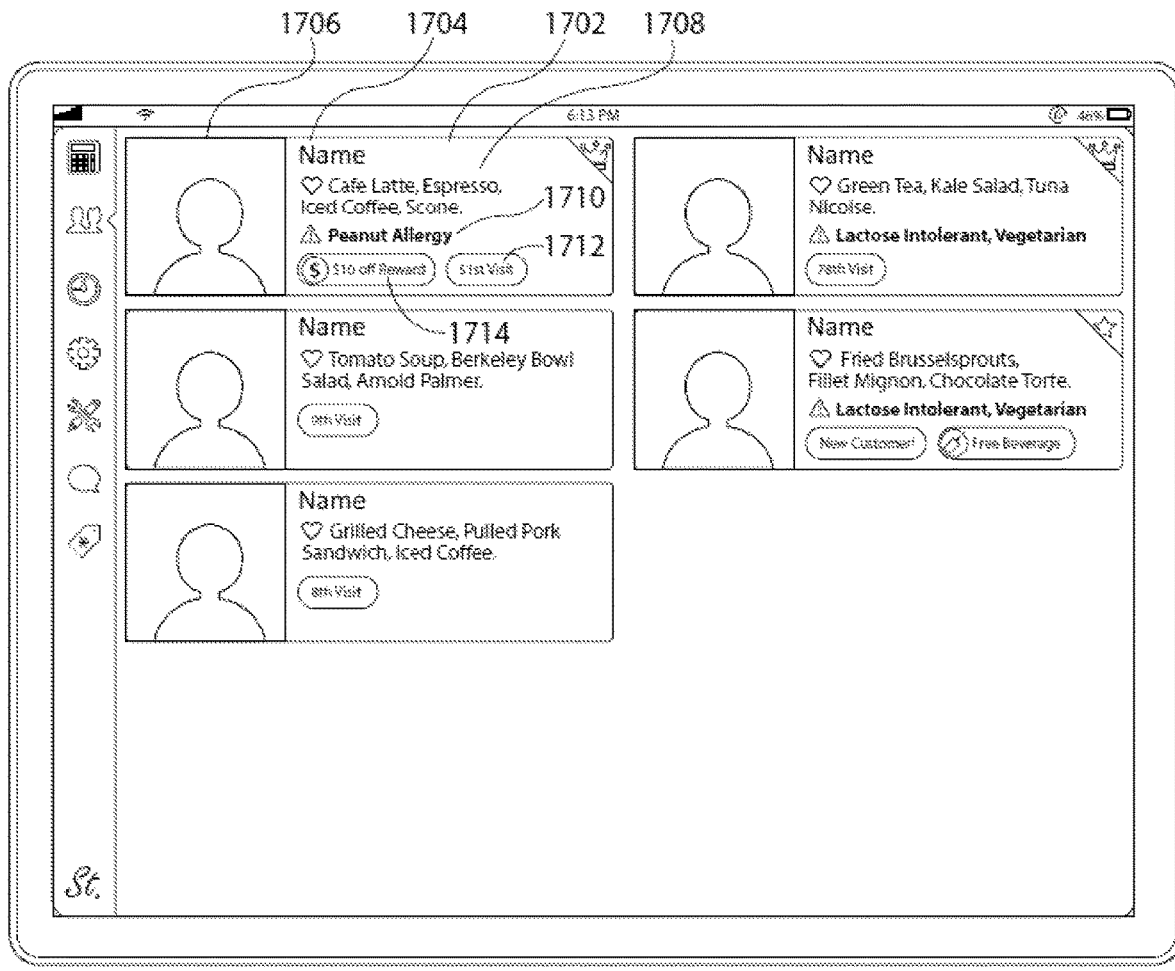

FIG. 17 shows an example consumer preference display 1700 that may be shown on the merchant device, such as upon a selection of table 1602 in floor plan display 1600. As shown, table 1602 includes five seated consumers, each with a different consumer entry within consumer preference display 1700. For example, consumer entry 1702 may include a display of consumer name at 1704, consumer image at 1706, recommended/favorite items at 1708, preference information at 1710, visit count at 1712, and/or promotional deals/rewards at 1714. Virtually any consumer information associated with the consumer may be shown in consumer preference display 1700. In some embodiments, the consumer device may be configured to allow the consumer to set what consumer information is available to the merchant. Additionally and/or alternatively, the merchant device may be configured to allow the merchant to set the types of consumer information that is shown, as well as the timing of the types of consumer information shown, in consumer preference display 1700.

In some embodiments, relevant types of consumer information (e.g., dine-in preference data) may be displayed on the merchant device depending on the stage of the dine-in experience. For example, consumer information related to consumer table setting preferences may be displayed shortly after a dine-in location has been associated with consumer identifying data such that the merchant may prepare the table accordingly. In another example, menu item preferences may be displayed when the merchant is taking orders for providing recommendations, customized orders (e.g., remove allergic ingredients), or the like. Method 1400 may then end at 1412.

Secure Payment Via Consumer Device

FIG. 15 shows a flow chart of an example method 1500 for facilitating transactions between a consumer and a merchant, performed in accordance with some embodiments. Method 1500 may be performed after method 1300 and/or method 1400, for example, such as after consumer identifying data has been associated with a dine-in location.

Method 1500 may begin at 1502, where the merchant device may be configured to associate the consumer identifying data (and/or wallet identifying data) with a restaurant tab identifier. As discussed above, a restaurant tab identifier refers to data that identifies a restaurant tab. For example, one or more menu items may be placed on the restaurant tab when the consumer places an order. The consumer may then pay the restaurant tab using the consumer device, such as upon completion of the meal and/or order.

At 1504, the merchant device may be configured to associate menu item data indicating one or more menu items with the restaurant tab identifier. For example, the merchant device may be configured to receive the menu item data via merchant input. The menu item data may further include price data for the one or more menu items.

Figure 18:
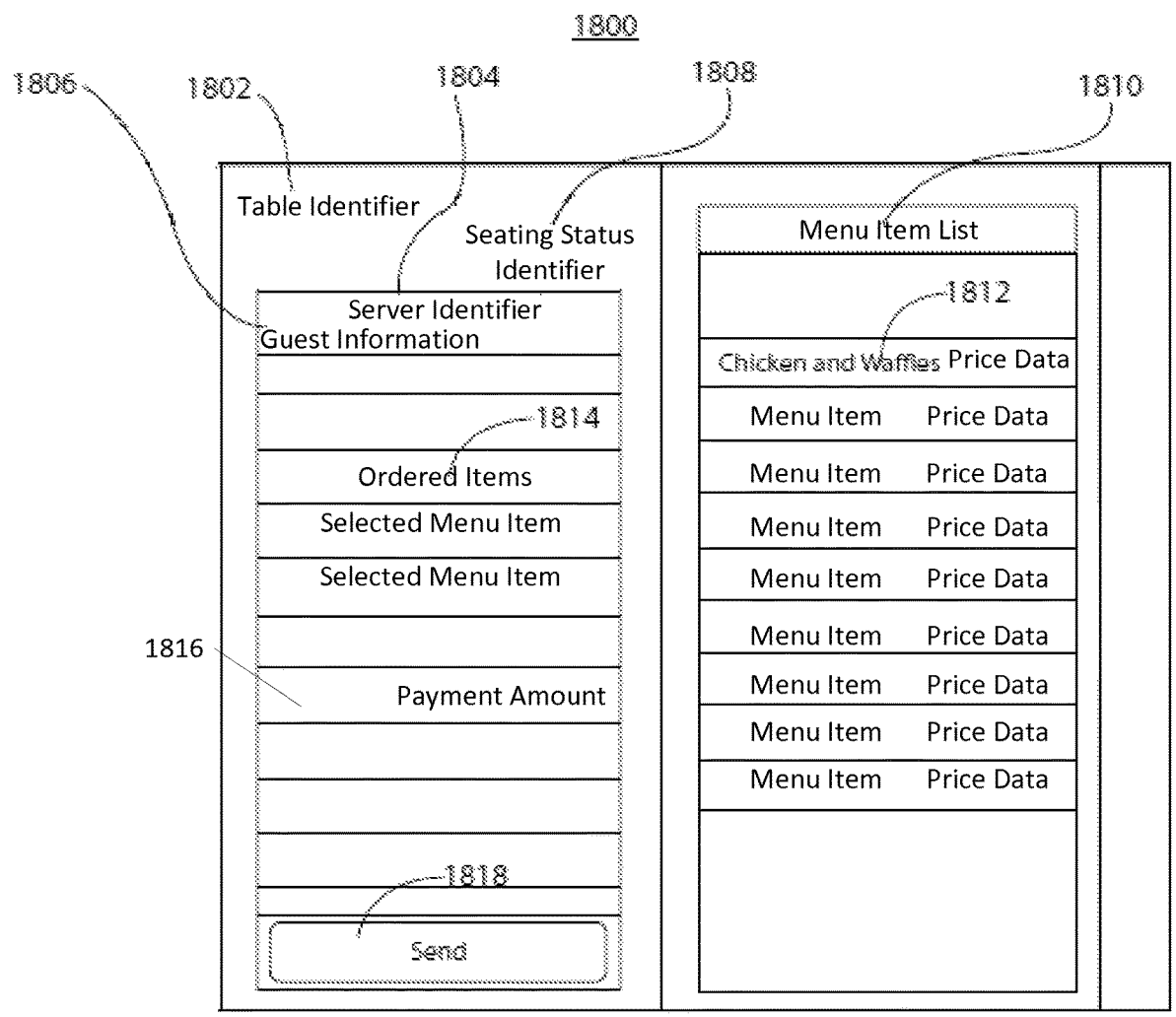

FIG. 18 shows an example restaurant tab display 1800 that may be displayed on the merchant device, in accordance with some embodiments. Restaurant tab display 1800 may be used by a merchant to add and/or remove menu items from the restaurant tab. Restaurant tab display 1800 may include informational displays that in some embodiments may be selectable to access additional related data and/or functionality, such as table identifier 1802, server identifier 1804, guest information 1806, and seating status information 1808. Furthermore, restaurant tab display 1800 may include selectable menu list 1810, configured to allow the merchant to select one or more menu items for association with the restaurant tab. An example menu item is Chicken and Waffles, shown at 1812 with associated price data. Selected menu items may be indicated at ordered items display 1814.

In some embodiments, the merchant device may be configured to allow the merchant to access restaurant tab display 1800 and/or other suitable interface for generating the restaurant tab by selecting a dine-in location (e.g., table 1602 from floor plan display 1600) and/or a consumer (e.g., consumer entry 1702 from consumer preference display 1700). The dine-in location (e.g., table identifier), consumer identifying data and restaurant tab identifier may all be associated to facilitate such functionality, among others discussed herein. As discussed above, the consumer device may be further configure to order one or more menu items via the Internet in some embodiments either at the seating location, prior to being seated but at the merchant, and/or prior to arriving at the merchant (e.g., via the Internet), as discussed in greater detail in U.S. patent application Ser. No. 13/657,728, entitled "Facilitating Online Transactions," incorporated by reference in its entirety above.

At 1506, the merchant device may be configured to determine a payment amount based on the menu item data. For example, the payment amount may be determined based on the price data for the one or more menu items associated with the restaurant tab. In some embodiments, the payment amount may also be displayed on the merchant device, as shown at 1816 of restaurant tab display 1800. In some embodiments, the payment amount may reflect the redemption of a promotional voucher, coupon, or other promotional offering. For example, the value of a redeemed promotional voucher may be subtracted from the payment amount. Furthermore, the payment amount may include a tax amount determined based on the total cost of the one or more menu items associated with the restaurant tab.

At 1508, the merchant device may be configured to send the transaction data (e.g., including the payment amount) to the consumer device. In some embodiments, the transaction data may further include a transaction ID (a unique number or code generated by the merchant device for each transaction), a merchant ID (a unique number or code associated with each merchant), and/or the menu item data.

In some embodiments, the transaction data may be sent responsive to the merchant selecting send selection 1818 in restaurant tab display 1800. Additionally and/or alternatively, the merchant device may be configured to send the menu item data indicating the one or more menu items to a ticket printer and/or kitchen/bar display, such as upon selecting send selection 1818 to facilitate menu item preparation. In some embodiments, merchant device may be configured to send the payment amount wirelessly to the consumer device via the PAN connection between the merchant device and the consumer device.

In some embodiments, the consumer device may be configured to perform one or more functions of the merchant device discussed above at 1502-1506. For example, the consumer device may be configured to receive, from the merchant device and/or the central system, menu information which may be used to associate menu item data with the restaurant tab identifier. Furthermore, some embodiments may allow the consumer device to add and/or delete one or more menu items associated with the restaurant tab identifier. In some embodiments, the consumer device may be configured to select one or more items online, such as even before the consumer has entered the merchant shop, as discussed in greater detail in U.S. patent application Ser. No. 13/657,728, entitled "Facilitating Online Transactions," incorporated by reference in its entirety above.

In some embodiments, the merchant device may be configured to allow the merchant to select from a plurality of payment types. For example, the merchant may ask the consumer how the consumer would like to pay. The consumer may decide, for example, to pay by cash, credit card or otherwise without using the consumer device. As such, the merchant device may be configured to accept alternative forms of payment. If the consumer decides to pay via the consumer device, the merchant may so indicate by selecting a pay-by-consumer device selection on the merchant device, which may cause the merchant device to send the payment amount to the consumer device.

At 1510, the consumer device may be configured to generate consumer approval data for the payment amount. Consumer approval data, as used herein, refers to data that is configured to provide an indication that the consumer has approved the payment and may refer to transaction data that is signed using a private key associated with the wallet identifying data (e.g., as sent to the consumer device at 1310 of method 1300) or otherwise secured with the wallet identifying data and/or private key.

In some examples, the consumer approval data, taking the form of an electronic signature, may be generated by using an algorithmic transformation, such as hashed (e.g., using cryptographic hash functions such as SHA-1). In one embodiment, the electronic signature created using the private key associated with the wallet identifying data may be a hash of the private key and at least some portion of the transaction data. In some embodiments, the consumer approval data may be sent to the merchant device via one or more messages that may also include the transaction data (e.g., merchant ID, merchant payment amount, employee payment amount, total payment amount, time of transaction, location, tip etc.) and/or the additional indication of consent. In examples, where a tip or other value is added, the consumer device may include an indication of the tip, an additional authorization or may otherwise cause an indicated tip to be added to the transaction data or otherwise provided to the merchant device (e.g., for approval) and ultimately to the central system. In some embodiments, the consumer approval data may include consumer data (e.g., consumer name, payment source information, payment account identification, etc.).

Alternatively or additionally, in some embodiments, at least one of the one or more messages may be encrypted using the wallet identifying data. As discussed above, the wallet identifying data may be a public key for encryption with an associated private key for decryption that is stored in the central system. Alternatively and/or additionally, at least one of the one or more messages (hashed or otherwise) may be signed using the wallet identifying data. For example, the wallet identifying data may be appended or otherwise included with a message to ensure the authenticity of the message (e.g., that the message was received from the consumer device). In some embodiments, both signing and encryption may be used.

In some embodiments, the one or more messages (encrypted, signed, hashed or otherwise) may be formatted with JavaScript Object Notation (JSON), where each piece of data is associated with a field. For example, an encrypted, hashed and/or signed message (e.g., in any order) may be included within a field as specified by the JSON format. Alternatively, unsecured messages may be formatted with JSON and then the formatted massage may be hashed, encrypted and/or signed (e.g., in any order).

Figure 21:
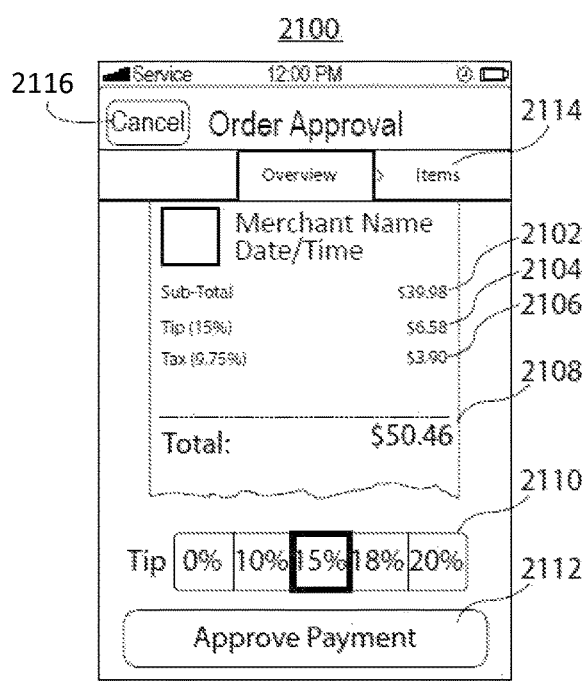

In some embodiments, generating the consumer approval data may include generating an indication of approval. FIG. 21 shows an example payment approval display 2100 that may be shown on the consumer device that includes the payment amount. Payment approval display 2100 may include sub-total display 2102, tip display 2104 (e.g., an employee payment amount), tax display 2106 and payment amount display 2108. Furthermore, the consumer may select shopping list selection 2114 to view a listing of menu items (e.g., the one or more menu items whose price data provides a basis for the sub-total).

Via payment approval display 2100, the consumer device may be configured to allow the consumer to select the employee payment amount. For example, the consumer may select a tip percentage using tip selection 2110. Responsive to a tip selection, tip display 2106 and total amount display 2108 may be updated to reflect the new tip and total amounts. As such, payment amount, as used herein, may further include the tip amount.

If the consumer is satisfied with the payment, the consumer may select approve payment selection 2112 to indicate approval of the payment. Additionally and/or alternatively, the consumer device may be configured allow and/or require the user to provide an additional indication of consent. For example, the consumer may be prompted to select a box (e.g., a checkbox that indicates consent), provide login data, generate a signature (e.g., via a touch sensitive device such as a touch sensor), enter a pin number, and/or provide a biometric identifier (e.g., a fingerprint, voice message, retina scan, behavioral identifier, etc.). If the consumer is not satisfied with the payment amount or otherwise does not approve of the payment, the consumer may select cancel order selection 2116.

In some embodiments, the consumer device may be configured to automatically approve the payment amount based upon satisfaction of one or more trigger conditions. As such, the consumer device may be configured to allow the consumer to preapprove payments (e.g., in the form of a predetermined tip percentage for tip payments), such as even prior to coming within proximity to the merchant device as discussed in method 1300.

For example, the identity of the merchant may serve as a trigger condition for automatic payment in some embodiments. The consumer may be allowed to add one or more merchants to an approved merchant list, such as via communications with the central system. As such, upon receiving a payment request for merchant and/or employee of the merchant on the approved merchant list, the consumer device may be configured to automatically generate and send the payment approval data to the merchant device. The merchant list may be stored on the consumer device and/or the central system. In some embodiments, the consumer device may be configured use the merchant data received from the merchant device at 1312 of method 1300 to determine whether the merchant is on the approved merchant list.

In some embodiments, the location of the consumer device may serve as a trigger condition for automatic payment. For example, the consumer device may be configured to allow the consumer to simply walk out of the restaurant after completion of a meal. The location of the consumer device may be tracked such that the payment approval data is sent to the merchant device when the consumer device leaves the restaurant, becomes a certain distance from the merchant device, drops out of communicable range with the merchant device, etc.

In some embodiments, reception of the payment amount by the consumer device may serve as a trigger condition for automatic payment. Combinations of one or more trigger conditions may be used. For example, the consumer device may be configured to send the payment approval data only to merchants on the approved merchant list upon receiving the payment amount from a merchant device of the approved merchant. Other example trigger conditions may include merchant device location, merchant type (e.g., retailers, restaurants, etc.), the payment amount (e.g., automatically approve payments below a specified amount), a per-day cost threshold (e.g., up to $100 per day can be automatically approved), etc.

In some embodiments, the consumer device may be configured to allow a consumer to set automatic approvals on or off. Additionally and/or alternatively, a consumer may specify that only certain types of transactions require approval. In another example, approval for an initial payment may be required at a merchant, but not for subsequent payments. Similarly, an approved merchant may be removed or otherwise set such that the next and/or every transaction with the merchant require manual approval.

In some embodiments, the merchant device may be configured to set whether to allow automatic payment approval by consumers based on one or more trigger conditions. For example, the merchant device may specify that all payments require manual approval, payments from certain consumers require manual approval, or payments above a certain threshold amount require manual approval, etc.

Returning to FIG. 15, the consumer device may be configured to send the consumer approval data to the merchant device at 1512. As discussed above, the consumer approval may provide a secure indication that the consumer has approved the payment.

At 1514, the merchant device may be configured to generate secured payment approval data. In some example embodiments, the secured payment approval data is a combination or other association of the consumer approval data and the transaction data sent at 1508. In some examples, the consumer approval data may take the form of the secured payment approval data and, in such embodiments, the merchant device may function as a pass through device.

In some embodiments, the secured payment approval data may include the consumer approval data and the total amount (e.g., the payment amount sent to the consumer device with the transaction data plus the tip amount added by the consumer). For example, the consumer device may be configured to send the consumer approval data with the tip amount to the merchant device, where the tip amount is separate from the consumer approval data. The merchant device may then be configured to add the tip amount to payment amount to generate the total amount, which may be a component and/or a separate part of the secured payment approval data.

At 1516, the merchant device may be configured to send the secured payment approval data to the central system. In some embodiments, the secured payment approval data may be sent to the central system without any substantial processing and/or decoding by the merchant device. As such, the central system may be configured to facilitate financial transactions between the consumer device and merchant device (e.g., process payments from the consumer payment account to the merchant).

In some embodiments, the merchant device may be configured to store the secured payment approval data for a period of time prior to sending the secured payment approval data to the central system. For example, if the secure connection with the central system is lost or otherwise unavailable, the secured payment approval data may be stored until the secure connection is reestablished.

At 1518, the central system may be configured to validate the secured payment approval data and when the secured payment approval data is validated, process the payment. As discussed above, in some embodiments, the secured payment approval data may include the consumer approval data (e.g., as generated by the consumer device using the transaction data and the private key) and the transaction data. As such, the central system may be configured to generate or otherwise recreate the consumer approval data using the transaction data and the private key stored at the central system. If the recreated consumer approval data matches what was sent with the secured payment approval data from the merchant device, the secured payment approval data may be validated. As discussed above, the private key may be configured to validate the secured payment approval data such that the data may be relied upon and thereby processed or otherwise used.

Where encryption was used to secure the payment approval data with the wallet identifying data, the central system may be configured to decrypt the payment approval data with the corresponding private key.

In some embodiments, processing the payment may further include communicating with one or more payment processing servers, third party servers, credit card servers, bank account servers, and/or any other type of financial transaction server that may be suitable to complete the financial transaction. For example, the central system may send transaction data to one or more third party servers and receive an indication as to whether the financial transaction was successful.

At 1520, the central system may be configured to send a payment confirmation to the merchant device. For example, the payment confirmation may indicate whether the payment was successfully processed. An indication may be shown on the merchant device to alert the merchant. For example, if the payment was not successful, the merchant may request that the consumer provide an alternate form of payment and/or to resubmit the payment via the consumer device.

At 1522, the central system may be configured to send a receipt for the payment to the merchant device, which may then be sent to the consumer device at 1524 via the PAN connection. As such, the consumer device does not need an active connection to the central system to receive the receipt. The receipt may alternatively, and/or additionally, be sent directly to the consumer device, such as when a direct connection to the consumer device is available.

In some embodiments, two or more consumers (e.g., via consumer identifying data) may be associated with the same unit of location (e.g., dine-in location) and/or restaurant tab. For example, the consumers may be members of the same party and seated accordingly at a common table. Method 1500 may be modified to allow consumers to settle (e.g., split) the restaurant tab (e.g., accordingly to consumer specifications).

For example, the merchant device may be configured to send transaction data (e.g., including the payment amount) to two or more consumer devices associated with the same table identifier and/or restaurant tab identifier at 1508. Alternatively and/or additionally, a consumer device may be configured to share the transaction data received from the merchant device with other consumer devices (e.g., either using direct connections or via the merchant device over the PAN network). The two or more consumer device may be each configured to pay a portion of the total payment amount. In some embodiments, the transaction data may further include menu item data. Here, each consumer device may be allowed to select one or more menu items in the restaurant tab as indicated by the transaction data. A total cost for each consumer device may be determined by the consumer devices. Next, payments using the multiple consumer devices may be processed based on the techniques described herein. Additional examples of payment splitting among consumer devices, applicable to some embodiments, are discussed in U.S. Provisional Patent Application No. 61/706,664, entitled "Online Ordering for In-Shop Service," incorporated by reference above.

Figure 22:
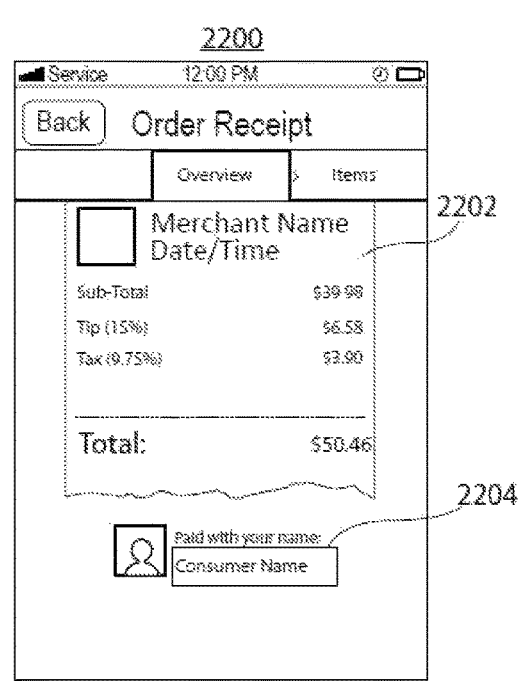

FIG. 22 shows an example receipt display 2200, in accordance with some embodiments. Receipt display 2200 may be shown on the consumer device to provide an indication to the consumer that the financial transaction was successfully. As such, receipt display 2200 may include transaction data at 2202 and payment confirmation display 2204, confirming payment via the consumer device.

Figure 23:
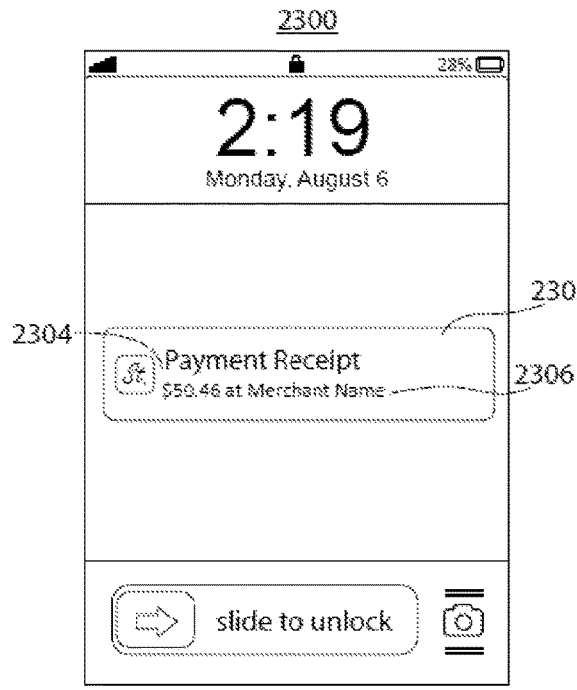

FIG. 23 shows a receipt notification display 2300 that may be additionally and/or alternatively shown on the consumer device. For example, receipt notification display 2300 may be popup notification that may be presented on the consumer device, even when the consumer device is locked or executing the consumer service in the background. Receipt notification display 2300 may include notification selection 2302 that includes transaction price indicator 2304 and merchant indicator 2306. In some embodiments, displays providing more detailed receipt information may be shown on the consumer device responsive to the consumer selecting notification selection 2302.

Figure 24:
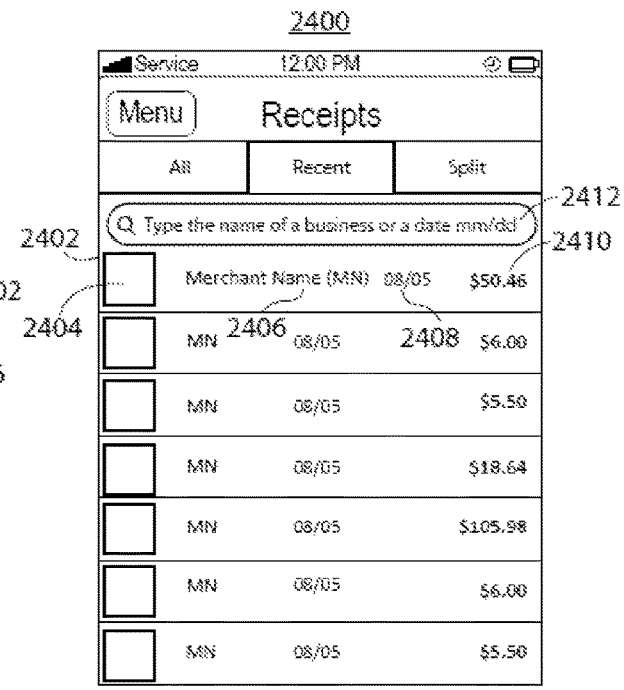

FIG. 24 shows an example receipt listing display 2400, in accordance with some embodiments. Receipt listing display 2400 may be configured to provide a listing of receipts associated with the consumer payment account. Receipt listing display 2400 may be accessed, for example, by selecting receipts selection 1906 in consumer service menu display 1900. As shown, a listed receipt (e.g., listed receipt 2402) may include a display of merchant image 2404 (e.g., a trademark, symbol, slogan, icon, graphic, photograph, etc.), merchant name 2406, transaction date 2408 and/or amount paid 2410. The receipts may be listed based on virtually any ordering criteria, such as the transaction date or merchant name, in some example embodiments.

In some embodiments, receipts may be searchable. For example, a consumer may enter search criteria (e.g., merchant name or transaction date as shown in FIG. 2400) in receipt search 2412. Responsive to entering the search, the consumer device may show a listing of receipts that fit, or come closest to fitting, the search criteria.

Figure 25:
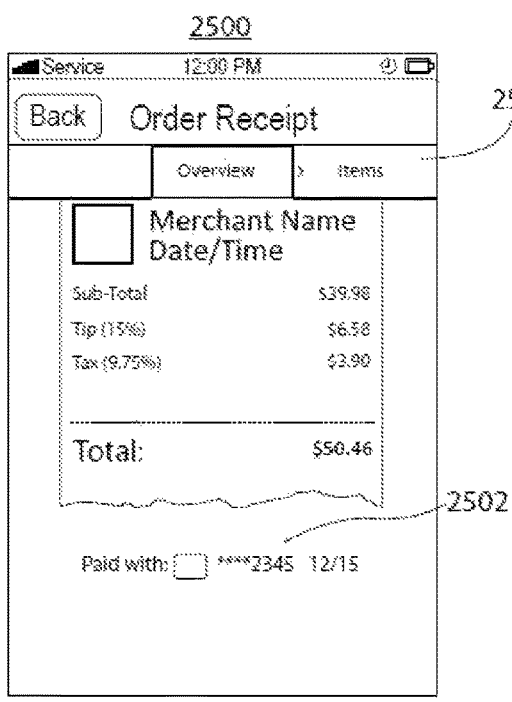

In some embodiments, the listed receipts in receipt listing display 2400 may be selectable. Upon selecting a listed receipt, additional information about the receipt may be shown on the consumer device. For example, upon selecting listed receipt 2402, the consumer device may be configured to show receipt display 2500. The discussion above regarding receipt display 2200 may be applicable to receipt display 2500. In some embodiments, receipt display 2500 may alternatively and/or additionally include payment source identifier 2502. As shown in FIG. 25, payment source identifier 2502 indicates that the payment was made with a credit card account having a credit card number ending with 2345 and a 12/15 expiration date.

Figure 26:
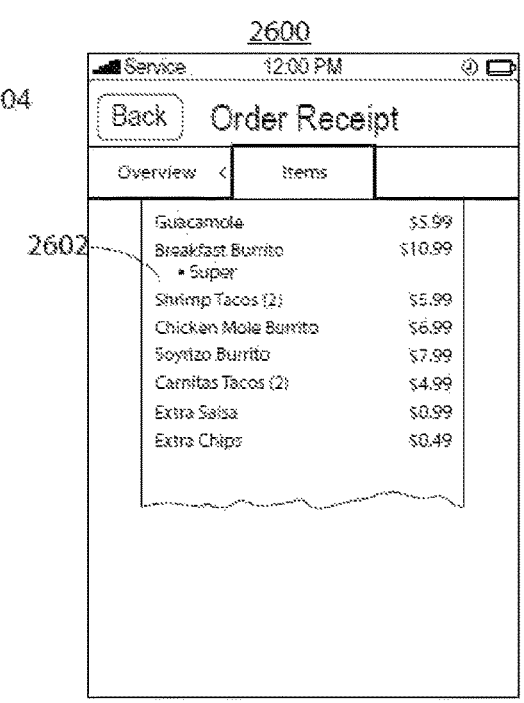

In some embodiments, the consumer device may be configured to allow the consumer to view items associated with the receipt. For example, the consumer may select receipt item selection 2504 in receipt display 2500. FIG. 26 shows an example view receipt items display 2600 that includes receipt items listing 2602. As shown, receipt items listing 2602 may include a list of items and associated price data.

Returning to FIG. 15, at 1526, the merchant device may be configured to send consumer information to the central system. For example, the consumer information may include menu item data indicating the one or more menu items that were associated with the restaurant tab at 1504. In some embodiments, the consumer information may include dine-in location preference data (e.g., as received from the consumer device at 1322 of method 1300) and/or the dine-in location as determined based on location data (e.g., at 1336 of method 1330). The consumer information, dine-in location preference data, and or any other suitable type of information may be sent to the central system to facilitate consumer service, such as upon a subsequent visit to the restaurant by the consumer. For example, the central system may be configured to store, process and/or send the consumer information back to a merchant device (e.g., at 1320 of method 1300). Method 1500 may then end.

Exemplary System Architecture

FIG. 27 shows system 2700 including an example network architecture, which may include one or more devices and sub-systems that are configured to implement some embodiments discussed herein. For example, system 2700 may include central system 2702, which can include, for example, central server 2704 and central database 2706, among other things (not shown). Central server 2704 may be any suitable network server, a plurality of networked servers, and/or other type of processing device. Central database 2706 may be any suitable network database configured to store information that may be used to facilitate the techniques as discussed herein. In this regard, system 2702 may include, for example, at least one backend data server, network database, cloud computing device, among other things.

Central system 2702 may be coupled to one or more merchant devices (e.g., merchant device 2710) via network 2708. In this regard, network 2708 may include any wired or wireless communication network including, for example, a wired or wireless local area network (LAN), personal area network (PAN), metropolitan area network (MAN), wide area network (WAN), mobile broadband network, or the like, as well as any hardware, software and/or firmware required to implement it (such as, e.g., network routers, etc.). For example, network 2708 may include a cellular telephone, an 802.11, 802.16, 802.20, and/or WiMax network. Further, the network 2708 may include a public network, such as the Internet, a private network, such as an intranet, or combinations thereof, and may utilize a variety of networking protocols now available or later developed including, but not limited to TCP/IP based networking protocols.

As discussed above, merchant device 2710 may be associated with a merchant, such as a retail store, restaurant, etc. or one or more employees of the merchant. In some embodiments, merchant device 2710 may be a POS device that is configured to receive payments at the merchant's shop. As such, merchant device 2710 may include a personal computer and/or other networked device, such as a cellular phone, tablet computer, mobile device, etc., that may be used for any suitable purpose in addition to providing POS functionality at the restaurant.

System 2700 may further include one or more consumer devices (e.g., consumer device 2712). Consumer device 2712 may connect with merchant device 2710 via network 2708 and/or PAN network 2716. As such, consumer device 2712 may be configured to make communicate with merchant device 2710 via PAN network 2716 even if consumer device 2712 and/or merchant device 2710 do not have active connections with network 2708.

In some embodiments, central system 2700 may further include one or more third party systems (e.g., third party system 2714), among other things. In some embodiments, different third party systems may be associated with different types of payment sources or payment destinations. Thus for each payment source or destination, data may be sent to an appropriate third party system (e.g., a credit card transaction server, a bank account, etc.) to validate and/or process payments. Furthermore, employee accounts, merchant accounts, and/or consumer payment accounts may be associated with one or more third party accounts that are provided by third party system 2714.

In some embodiments, central system 2702 may be a multi-tenant database system configured to provide services to a plurality of consumers and merchants. Additionally and/or alternatively, central system 2702 may be configured to include, or work in connection with, online ordering systems (e.g., shop online and pickup), promotional systems (e.g., deal voucher accounts, offerings, purchases, and redemptions, where the value of a redeemed voucher may be deducted from the payment), merchant systems (e.g., kitchen systems for restaurants), and/or appointment systems (e.g., scheduling a reservation at a restaurant). As such, the techniques disclosed herein may be applicable to any environment that involves consumer and merchants.

FIG. 28 shows a schematic block diagram of circuitry 2800, some or all of which may be included in, for example, central system 2804, consumer device 2812, and/or merchant device 2810. In accordance with some example embodiments, circuitry 2800 may include various means, such as one or more processors 2802, memories 2804, communications modules 2806, and/or input/output modules 2808.

In some embodiments, such as when circuitry 2800 is included in merchant device 2810 and/or central system 2802, payment/redemption module 2810 may also or instead be included. As referred to herein, "module" includes hardware, software and/or firmware configured to perform one or more particular functions. In this regard, the means of circuitry 2800 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 2804) that is executable by a suitably configured processing device (e.g., processor 2802), or some combination thereof.

Processor 2802 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 28 as a single processor, in some embodiments, processor 2802 comprises a plurality of processors. The plurality of processors may be embodied on a single computing device or may be distributed across a plurality of computing devices collectively configured to function as circuitry 2800. The plurality of processors may be in operative communication with each other and may be collectively configured to perform one or more functionalities of circuitry 2800 as described herein. In an example embodiment, processor 2802 is configured to execute instructions stored in memory 2804 or otherwise accessible to processor 2802. These instructions, when executed by processor 2802, may cause circuitry 2800 to perform one or more of the functionalities of circuitry 2800 as described herein.

Whether configured by hardware, firmware/software methods, or by a combination thereof, processor 2802 may comprise an entity capable of performing operations according to embodiments of the present invention while configured accordingly. Thus, for example, when processor 2802 is embodied as an ASIC, FPGA or the like, processor 2802 may comprise specifically configured hardware for conducting one or more operations described herein. As another example, when processor 2802 is embodied as an executor of instructions, such as may be stored in memory 2804, the instructions may specifically configure processor 2802 to perform one or more algorithms and operations described herein.

Memory 2804 may comprise, for example, volatile memory, non-volatile memory, or some combination thereof. Although illustrated in FIG. 28 as a single memory, memory 2804 may comprise a plurality of memory components. The plurality of memory components may be embodied on a single computing device or distributed across a plurality of computing devices. In various embodiments, memory 2804 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 2804 may be configured to store information, data, applications, instructions, or the like for enabling circuitry 2800 to carry out various functions in accordance with example embodiments discussed herein. For example, in at least some embodiments, memory 2804 is configured to buffer input data for processing by processor 2802. Additionally or alternatively, in at least some embodiments, memory 2804 may be configured to store program instructions for execution by processor 2802. Memory 2804 may store information in the form of static and/or dynamic information. This stored information may be stored and/or used by circuitry 2800 during the course of performing its functionalities.

Communications module 2806 may be embodied as any device or means embodied in circuitry, hardware, a computer program product comprising computer readable program instructions stored on a computer readable medium (e.g., memory 2804) and executed by a processing device (e.g., processor 2802), or a combination thereof that is configured to receive and/or transmit data from/to another device, such as, for example, a second circuitry 2800 and/or the like. In some embodiments, communications module 2806 (like other components discussed herein) can be at least partially embodied as or otherwise controlled by processor 2802. In this regard, communications module 2806 may be in communication with processor 2802, such as via a bus. Communications module 2806 may include, for example, an antenna, a transmitter, a receiver, a transceiver, network interface card and/or supporting hardware and/or firmware/software for enabling communications with another computing device. Communications module 2806 may be configured to receive and/or transmit any data that may be stored by memory 2804 using any protocol that may be used for communications between computing devices. Communications module 2806 may additionally or alternatively be in communication with the memory 2804, input/output module 2808 and/or any other component of circuitry 2800, such as via a bus.

Input/output module 2808 may be in communication with processor 2802 to receive an indication of a user input and/or to provide an audible, visual, mechanical, or other output to a user. Some example visual outputs that may be provided to a user by circuitry 2800 are discussed in connection with the displays described above. As such, input/output module 2808 may include support, for example, for a keyboard, a mouse, a joystick, a display, an image capturing device, a touch screen display, a microphone, a speaker, a RFID reader, barcode reader, biometric scanner, and/or other input/output mechanisms. In embodiments wherein circuitry 2800 is embodied as a server or database, aspects of input/output module 2808 may be reduced as compared to embodiments where circuitry 2800 is implemented as an end-user machine (e.g., consumer device and/or merchant device) or other type of device designed for complex user interactions. In some embodiments (like other components discussed herein), input/output module 2808 may even be eliminated from circuitry 2800. Alternatively, such as in embodiments wherein circuitry 2800 is embodied as a server or database, at least some aspects of input/output module 2808 may be embodied on an apparatus used by a user that is in communication with circuitry 2800, such as for example, merchant device 2810 and/or consumer device 2812. Input/output module 2808 may be in communication with memory 2804, communications module 2806, and/or any other component(s), such as via a bus. Although more than one input/output module and/or other component can be included in circuitry 2800, only one is shown in FIG. 28 to avoid overcomplicating the drawing (like the other components discussed herein).

Payment/redemption module 2810 may also or instead be included and configured to perform the functionality discussed herein related to facilitating payment transactions discussed above. In some embodiments, some or all of the functionality facilitating payment transactions may be performed by processor 2802. In this regard, the example processes and algorithms discussed herein can be performed by at least one processor 2802 and/or payment/redemption module 2810. For example, non-transitory computer readable storage media can be configured to store firmware, one or more application programs, and/or other software, which include instructions and other computer-readable program code portions that can be executed to control processors of the components of system 2800 to implement various operations, including the examples shown above. As such, a series of computer-readable program code portions may be embodied in one or more computer program products and can be used, with a computing device, server, and/or other programmable apparatus, to produce the machine-implemented processes discussed herein.

Any such computer program instructions and/or other type of code may be loaded onto a computer, processor or other programmable apparatus's circuitry to produce a machine, such that the computer, processor other programmable circuitry that executes the code may be the means for implementing various functions, including those described herein.

It is also noted that all or some of the information presented by the example displays discussed herein can be based on data that is received, generated and/or maintained by one or more components of system 2700. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. Each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 2802 and/or payment/redemption module 2810 discussed above with reference to FIG. 28, to produce a machine, such that the computer program product includes the instructions which execute on the computer or other programmable data processing apparatus create a means for implementing the functions specified in the flowchart block or blocks.

These computer program instructions may also be stored in a computer-readable storage medium (e.g., memory 2804) that can direct a computer or other programmable data processing apparatus to function in a particular manner, such that the instructions stored in the computer-readable storage medium produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, the block diagrams and flowchart illustrations support combinations of means for performing the specified functions, combinations of steps for performing the specified functions and program instruction means for performing the specified functions. It will also be understood that each block/step of the circuit diagrams and process flowcharts, and combinations of blocks/steps in the circuit diagrams and process flowcharts, can be implemented by special purpose hardware-based computer systems that perform the specified functions or steps, or combinations of special purpose hardware and computer instructions.

CONCLUSION

Many modifications and other embodiments of the inventions set forth herein will come to mind to one skilled in the art to which these embodiments of the invention pertain having the benefit of the teachings presented in the foregoing descriptions and the associated drawings. For example, although the examples discussed herein do not require the consumer to present a form of payment (such as a credit card) to the merchant, some embodiments of the merchant device can be configured to work with one or more peripheral devices that can receive payment information directly from a consumer (such as a credit card reader, radio frequency identification reader, etc.) in addition to or instead of from the central system. Furthermore, as discussed above, some embodiments may be configured to function in settings other than restaurants. For example, the dine-in location at a restaurant discussed herein may also refer to some other unit of location, such as a kiosk, aisle, information desk, display, counter or the like at a retail store. As such, the consumer may be associated with the unit of location and may be provided assistance accordingly. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for location inference in a distributed computing environment, the apparatus comprising:
   at least one processor; and
   at least one memory including program code, wherein the program code is configured to, when executed by the at least one processor, cause the apparatus to at least:
      receive, via a peer-to-peer communication channel, a plurality of location configuration peer-to-peer communications from a plurality of internal computing devices associated with the distributed computing environment, wherein each location configuration peer-to-peer communication of the plurality of location configuration peer-to-peer communications describes a per-device strategic location of a corresponding internal computing device of the plurality of internal computing devices that is associated with the location configuration peer-to-peer communication within a physical environment associated with the distributed computing environment;
      determine, based on the plurality of location configuration peer-to-peer communications, a location layout of the physical environment, wherein the location layout describes each per-device strategic location for the plurality of internal computing devices;
      receive, via an unsecured direct wireless communication channel, an external interaction communication from a first internal computing device of the plurality of internal computing devices, wherein the external interaction communication describes: (i) a relative location of an external computing device in relation to the per-device strategic location of the first internal computing device and (ii) an external computing device identifier of the external computing device, and wherein the first internal computing device is configured to determine the relative location by applying triangulation to received signal strength indication data associated with the external computing device;
      in response to receiving the external interaction communication, transmit, via a secured communication channel, an external device property request to a central computing device, wherein the external device property request describes the external computing device identifier, and wherein the plurality of internal computing devices do not have an active internet connection to the secured communication channel;
      receive, in response to the external device property request and via the secured communication channel, external device property data associated with the external computing device;
      perform a transaction between the first internal computing device and the external computing device in response to the external interaction communication and a private key sent from the first internal computing device of the plurality of internal computing devices, and using a secured transaction of the external device property request and the external device property data on the secured communication channel between the external computing device and the central computing device;
      generate user interface data that is configured to describe: (i) at least a portion of the location layout, (ii) the relative location of the external computing device, and (iii) the external device property data; and
      cause a display device to present the user interface data via an interactive user interface.

2. The apparatus of claim 1, wherein the at least one memory and the program code are further configured to, with the at least one processor, cause the apparatus to at least:
   receive per-device strategic location data describing an apparatus location of the apparatus within the physical environment; and
   transmit one or more location announcement peer-to-peer communications to the plurality of internal computing devices, wherein each location announcement peer-to-peer communication of the one or more location announcement peer-to-peer communications describe the apparatus location.

3. The apparatus of claim 2, wherein the at least one memory and the program code are further configured to, with the at least one processor, cause the apparatus to at least:
   receive second signal strength indication data associated with a second external computing device;
   determine, based on the second signal strength indication data, a second relative location of the second external computing device in relation to the apparatus location; and
   transmit one or more interaction announcement peer-to-peer communications to the plurality of internal computing devices, wherein each interaction announcement peer-to-peer communication of the one or more interaction announcement peer-to-peer communications describes the second relative location.

4. The apparatus of claim 1, wherein the external device property data describe an operational load quantity associated with the external computing device.

5. The apparatus of claim 1, wherein the external device property data describes transactional history data of a user profile associated with the external computing device.

6. The apparatus of claim 1, wherein the external device property data describes preference data of a user profile associated with the external computing device.

7. The apparatus of claim 1, wherein:
the physical environment is associated with one or more location units, and
a relative location and the per-device strategic location of the first internal computing device are associated with a common location unit of the one or more location units.

8. A computer-implemented method for location inference in a distributed computing environment, the computer-implemented method comprising:
receiving, using one or more processors and via a peer-to-peer communication channel, a plurality of location configuration peer-to-peer communications from a plurality of internal computing devices associated with the distributed computing environment, wherein each location configuration peer-to-peer communication of the plurality of location configuration peer-to-peer communications describes a per-device strategic location of a corresponding internal computing device of the plurality of internal computing devices that is associated with the location configuration peer-to-peer communication within a physical environment associated with the distributed computing environment;
determining, using the one or more processors and based on the plurality of location configuration peer-to-peer communications, a location layout of the physical environment, wherein the location layout describes each per-device strategic location for the plurality of internal computing devices;
receiving, using the one or more processors and via an unsecure direct wireless communication channel, an external interaction communication from a first internal computing device of the plurality of internal computing devices, wherein the external interaction communication describes: (i) a relative location of an external computing device in relation to the per-device strategic location of the first internal computing device and (ii) an external computing device identifier of the external computing device, and wherein the first internal computing device is configured to determine the relative location by applying triangulation to received signal strength indication data associated with the external computing device;
in response to receiving the external interaction communication, transmitting, using the one or more processors and via a secured communication channel, an external device property request to a central computing device, wherein the external device property request describes the external computing device identifier, and wherein the plurality of internal computing devices do not have an active internet connection to the secured communication channel;
receiving, using the one or more processors, via the secured communication channel, and in response to the external device property request, external device property data associated with the external computing device;
performing a transaction between the first internal computing device and the external computing device in response to the external interaction communication and a private key sent from the first internal computing device of the plurality of internal computing devices, and using a secured transaction of the external device property request and the external device property data on the secured communication channel between the external computing device and the central computing device;
generating, using the one or more processors, user interface data that is configured to describe: (i) at least a portion of the location layout, (ii) the relative location of the external computing device, and (iii) the external device property data; and
causing, using the one or more processors, a display device to present the user interface data via an interactive user interface.

9. The computer-implemented method of claim 8, further comprising:
receiving per-device strategic location data describing an apparatus location within the physical environment; and
transmitting one or more location announcement peer-to-peer communications to the plurality of internal computing devices, wherein each location announcement peer-to-peer communication of the one or more location announcement peer-to-peer communications describe the apparatus location.

10. The computer-implemented method of claim 9, further comprising:
receiving second signal strength indication data associated with a second external computing device;
determining, based on the second signal strength indication data, a second relative location of the second external computing device in relation to the apparatus location; and
transmitting one or more interaction announcement peer-to-peer communications to the plurality of internal computing devices, wherein each interaction announcement peer-to-peer communication of the one or more interaction announcement peer-to-peer communications describes the second relative location.

11. The computer-implemented method of claim 8, wherein the external device property data describe an operational load quantity associated with the external computing device.

12. The computer-implemented method of claim 8, wherein the external device property data describes transactional history data of a user profile associated with the external computing device.

13. The computer-implemented method of claim 8, wherein the external device property data describes preference data of a user profile associated with the external computing device.

14. The computer-implemented method of claim 8, wherein:
the physical environment is associated with one or more location units, and
a relative location and the per-device strategic location of the first internal computing device are associated with a common location unit of the one or more location units.

15. A computer program product for location inference in a distributed computing environment, the computer program product comprising at least one non-transitory computer-readable storage medium having computer-readable program code portions stored therein, the computer-readable program code portions configured to:
receive, via a peer-to-peer communication channel, a plurality of location configuration peer-to-peer communications from a plurality of internal computing devices associated with the distributed computing environment, wherein each location configuration peer-to-peer communication of the plurality of location configuration peer-to-peer communications describes a per-device strategic location of a corresponding internal computing device of the plurality of internal computing devices that is associated with the location configuration peer-to-peer communication within a physical environment associated with the distributed computing environment;

determine, based on the plurality of location configuration peer-to-peer communications, a location layout of the physical environment, wherein the location layout describes each per-device strategic location for the plurality of internal computing devices;

receive, via an unsecure direct wireless communication channel, an external interaction communication from a first internal computing device of the plurality of internal computing devices, wherein the external interaction communication describes: (i) a relative location of an external computing device in relation to the per-device strategic location of the first internal computing device and (ii) an external computing device identifier of the external computing device, and wherein the first internal computing device is configured to determine the relative location by applying triangulation to received signal strength indication data associated with the external computing device;

in response to receiving the external interaction communication, transmit, via a secured communication channel, an external device property request to a central computing device, wherein the external device property request describes the external computing device identifier, and wherein the plurality of internal computing devices do not have an active internet connection to the secured communication channel;

receive, in response to the external device property request and via the secured communication channel, external device property data associated with the external computing device;

perform a transaction between the first internal computing device and the external computing device in response to the external interaction communication and a private key sent from the first internal computing device of the plurality of internal computing devices, and using a secured transaction of the external device property request and the external device property data on the secured communication channel between the external computing device and the central computing device;

generate user interface data that is configured to describe: (i) at least a portion of the location layout, (ii) the relative location of the external computing device, and (iii) the external device property data; and cause a display device to present the user interface data via an interactive user interface.

16. The computer program product of claim 15, wherein the computer-readable program code portions are further configured to:

receive per-device strategic location data describing an apparatus location within the physical environment; and transmit one or more location announcement peer-to-peer communications to the plurality of internal computing devices, wherein each location announcement peer-to-peer communication of the one or more location announcement peer-to-peer communications describe the apparatus location.

17. The computer program product of claim 16, wherein the computer-readable program code portions are further configured to:

receive second signal strength indication data associated with a second external computing device;

determine, based on the second signal strength indication data, a second relative location of the second external computing device in relation to the apparatus location; and transmit one or more interaction announcement peer-to-peer communications to the plurality of internal computing devices, wherein each interaction announcement peer-to-peer communication of the one or more interaction announcement peer-to-peer communications describes the second relative location.

18. The computer program product of claim 15, wherein the external device property data describe an operational load quantity associated with the external computing device.

19. The computer program product of claim 15, wherein the external device property data describes transactional history data of a user profile associated with the external computing device.

20. The computer program product of claim 15, wherein the external device property data describes preference data of a user profile associated with the external computing device.

* * * * *